(12) United States Patent
Li et al.

(10) Patent No.: US 12,538,342 B2
(45) Date of Patent: Jan. 27, 2026

(54) METHOD AND DEVICE FOR REMOTE INTERFERENCE MANAGEMENT IN WIRELESS COMMUNICATION SYSTEM

(71) Applicant: Samsung Electronics Co., Ltd., Suwon-si (KR)

(72) Inventors: Fuyuan Li, Beijing (CN); Hong Wang, Beijing (CN); Weiwei Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/059,208

(22) Filed: Nov. 28, 2022

(65) Prior Publication Data

US 2023/0087340 A1    Mar. 23, 2023

Related U.S. Application Data

(63) Continuation of application No. 16/834,851, filed on Mar. 30, 2020, now Pat. No. 11,516,816.

(30) Foreign Application Priority Data

Mar. 28, 2019  (CN) .................. 201910245228.X
Apr. 9, 2019   (CN) .................. 201910281376.7

(51) Int. Cl.
*H04W 72/02*    (2009.01)
*H04L 5/00*     (2006.01)
(Continued)

(52) U.S. Cl.
CPC ......... *H04W 72/541* (2023.01); *H04L 5/0048* (2013.01)

(58) Field of Classification Search
CPC . H04W 88/085; H04W 76/27; H04W 72/046; H04W 76/30; H04W 72/21;
(Continued)

(56) References Cited

U.S. PATENT DOCUMENTS 10,735,968 B2 *   8/2020   Jang ..................... H04W 88/08
11,533,651 B2 *  12/2022   Liu ..................... H04W 88/085
(Continued)

FOREIGN PATENT DOCUMENTS

CN    102595436 A    7/2012
CN    106464408 A    2/2017
(Continued)

OTHER PUBLICATIONS

First Office Action dated Apr. 28, 2023, in connection with Chinese Application No. 201910281376.7, 16 pages.
(Continued)

*Primary Examiner* — Sai Aung

(57) ABSTRACT

The present disclosure provides a method and a device for performing remote interference management. The method comprises receiving, from a victim gNB, at least one RIM-reference signal (RS); transmitting, from a distributed unit (DU) of the aggressor gNB to a central unit (CU) of the aggressor gNB, a message comprising RIM information; and determining to stop monitoring the at least one RIM-RS based on the RIM information.

18 Claims, 12 Drawing Sheets

(51) Int. Cl.
*H04W 72/04* (2023.01)
*H04W 72/20* (2023.01)
*H04W 72/541* (2023.01)

(58) Field of Classification Search
CPC . H04W 74/0833; H04W 72/23; H04W 76/18; H04W 92/12; H04W 72/02; H04W 72/51
See application file for complete search history.

(56) References Cited

U.S. PATENT DOCUMENTS

| | | | |
|---|---|---|---|
| 11,588,594 B2* | 2/2023 | Park | H04W 76/32 |
| 2011/0188472 A1* | 8/2011 | Jeon | H04W 36/00837 370/331 |
| 2012/0149362 A1 | 6/2012 | Tooher et al. | |
| 2012/0275340 A1 | 11/2012 | McGann | |
| 2013/0267230 A1* | 10/2013 | Lin | H04W 24/02 455/436 |
| 2014/0050102 A1* | 2/2014 | Lee | H04W 24/10 370/242 |
| 2015/0208410 A1* | 7/2015 | Koutsimanis | H04W 72/27 370/252 |
| 2015/0257147 A1 | 9/2015 | Ji et al. | |
| 2015/0319633 A1 | 11/2015 | Ji et al. | |
| 2016/0150566 A1 | 5/2016 | Lee et al. | |
| 2017/0179984 A1 | 6/2017 | Kim et al. | |
| 2017/0339646 A1* | 11/2017 | Caretti | H04W 52/343 |
| 2018/0132248 A1 | 5/2018 | Yang et al. | |
| 2019/0052322 A1 | 2/2019 | Akkarakaran et al. | |
| 2020/0033849 A1 | 1/2020 | Yiu et al. | |
| 2020/0037330 A1 | 1/2020 | Sharma et al. | |
| 2020/0077288 A1* | 3/2020 | Tsuboi | H04W 76/16 |
| 2020/0229049 A1* | 7/2020 | Wu | H04W 36/087 |
| 2020/0344019 A1* | 10/2020 | Da Silva | H04W 24/10 |
| 2021/0359747 A1 | 11/2021 | Islam et al. | |
| 2022/0095309 A1* | 3/2022 | MolavianJazi | H04W 56/001 |

FOREIGN PATENT DOCUMENTS

| | | |
|---|---|---|
| CN | 109155654 A | 1/2019 |
| EP | 2665305 B1 | 3/2016 |
| IN | 201847011090 A | 4/2018 |
| WO | 2018126792 A1 | 7/2018 |

OTHER PUBLICATIONS

ZTE, "Consideration on reference signal design for remote interference management," R1-1808326, 3GPP TSG RAN WG1 Meeting #94, Gothenburg, Sweden, Aug. 20-24, 2018, 10 pages.
ZTE, "TP on Inter-gNB Coordination for RIM With Core Network Involvement," R3-186498, 3GPP TSG-RAN WG3 #102, Spokane, WA, USA, Nov. 12-16, 2018, 6 pages.
ZTE, "TP for Intra-cluster coordination," R3-186510, 3GPP TSG-RAN WG3 #102, Spokane, WA, USA, Nov. 12-16, 2018, 4 pages.
CMCC, "Agreements on NR-RIM frameworks," R1-1809943, 3GPP TSG RAN WG1 Meeting #94, Aug. 20-24, 2018, 3 pages.
Supplementary European Search Report dated Apr. 26, 2022 in connection with European Patent Application No. 20 77 8724, 10 pages.
Qualcomm Incorporated, "Coordinated RS Transmission," R3-185515, 3GPP TSG-RAN WG3 #101bis, Oct. 8-12, 2018, 3 pages.
Qualcomm Incorporated, "Dynamic Cell Group Configuration for Remote Interference Management," R3-186462, 3GPP TSG-RAN WG3 #102, Nov. 12-16, 2018, 5 pages.
Huawei, "gNB grouping and set ID assignment," R3-186493, 3GPP TSG-RAN3 Meeting #102, Nov. 12-16, 2018, 2 pages.
Catt, "Discussion on message routing for RIM," R3-186570, 3GPP TSG-RAN WG3 #102, Nov. 12-16, 2018, 3 pages.
Notification of Transmittal of the International Search Report and the Written Opinion of the International Searching Authority, or the Declaration dated Jul. 8, 2020 in connection with International Patent Application No. PCT/KR2020/004357, 9 pages.
Communication pursuant to Article 94(3) EPC dated Apr. 3, 2024, in connection with European Application No. 20778724.3, 5 pages.
Notification to Grant Patent Right for Invention dated Jan. 2, 2024, in connection with Chinese Application No. 201910281376.7, 7 pages.
China Telecom, "Some Considerations on Remote Interference Management for NR," R1-1809252, 3GPP TSG-RAN WG1 Meeting #94, Gothenburg, Sweden, Aug. 20-24, 2018, 4 pages.

* cited by examiner

METHOD AND DEVICE FOR REMOTE INTERFERENCE MANAGEMENT IN WIRELESS COMMUNICATION SYSTEM

CROSS-REFERENCE TO RELATED APPLICATIONS

This application is a continuation of application Ser. No. 16/834,851, filed Mar. 30, 2020, now U.S. Pat. No. 11,516, 816, which is based on and claims priority under 35 U.S.C. § 119 to the Chinese patent application No. 201910281376.7, filed on Apr. 9, 2019, and the Chinese patent application No. 201910245228.X, filed on Mar. 28, 2019, the entire disclosure of which is incorporated herein by reference as part of the present disclosure.

BACKGROUND

1. Field

The present disclosure relates to a wireless communication technology, and in particular, to a method and a device for interacting information on detection of remote interference, interference mitigation and so on between a central unit and a distributed unit of a base station.

2. Description of the Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

According to an aspect of the disclosure, a method for a distributed unit device of a base station is provided. The method includes: receiving information on reception status of a reference signal transmitted by a central unit device of the base station; and performing or stopping transmission of the reference signal based on the information on the reception status of the reference signal.

According to the method of the disclosure, the information on the reception status of the reference signal includes at least one of: identification information of the reference signal; indication information on disappearance of the reference signal; indication information on stopping transmission of the reference signal; information of cell or frequency on which transmission of the reference signal is stopped; indication information on reception of the reference signal; indication information on continuing transmission of the reference signal; and information of cell or frequency on which transmission of the reference signal is continued.

The method further includes: receiving information on remote interference measurement configuration transmitted by the central unit device of the base station; and performing remote interference measurement based on the information on the remote interference measurement configuration.

The method further includes: receiving information on reference signal transmission indication transmitted by the central unit device of the base station; and initiating transmission of the reference signal.

According to the method of the disclosure, the information on remote interference measurement configuration includes at least one of: a measurement method of remote interference; an interference reporting threshold or a reporting condition; a threshold for transmitting the reference signal; and reference signal configuration information.

According to the method of the disclosure, the information on reference signal transmission indication includes at least one of: a victim base station Set ID; reference signal configuration information; indication information on initiating transmission of the reference signal; and information of cell on which transmission of the reference signal is initiated.

The method further includes transmitting information on interference measurement report to the central unit device of the base station, wherein the information on the interference measurement report includes at least one of: information of cell on which remote interference is detected; and interference measurement result of each victim cell.

The method further includes transmitting information on reference signal transmission notification to the central unit device of the base station, wherein the information on reference signal transmission notification includes at least one of: information of cell on which the remote interference is detected; interference measurement result of each victim cell; notification information on the distributed unit device initiating transmission of the reference signal; information of cell on which transmission of the reference signal is initiated; reference signal configuration information; a victim base station Set ID; and response information on initiating transmission of the reference signal.

The method further includes transmitting information on a response to stopping transmission of the reference signal to the central unit device of the base station, wherein the information on the response to stopping transmission of the reference signal includes at least one of: notification information on the distributed unit device stopping transmission of the reference signal; identification information of the reference signal; and response information on stopping transmission of the reference signal.

According to another aspect of the disclosure, a method for a central unit device of a base station is provided. The method includes: receiving information on reception status of a reference signal from a central unit device of an aggressor base station through a backhaul network; and transmitting the information on the reception status of the reference signal to a distributed unit device of the base station, such that the distributed unit device of the base station performs or stops transmission of the reference signal based on the information on the reception status of the reference signal.

According to the method of the disclosure, the information on the reception status of the reference signal includes at least one of: identification information of the reference signal; indication information on disappearance of the reference signal; indication information on stopping transmission of the reference signal; information of cell or frequency on which transmission of the reference signal is stopped; indication information on reception of the reference signal; indication information on continuing transmission of the reference signal; and information of cell or frequency on which transmission of the reference signal is continued.

The method further includes: transmitting information on remote interference measurement configuration to the distributed unit device of the base station, such that the distributed unit device of the base station performs remote interference measurement based on the information on the remote interference measurement configuration.

The method further includes: transmitting information on the reference signal transmission indication to the distributed unit device of the base station, such that the distributed unit device of the base station initiates transmission of the reference signal.

According to the method of the disclosure, the information on the remote interference measurement configuration includes at least one of: a measurement method of remote interference; an interference reporting threshold or a reporting condition; a threshold for transmitting the reference signal; and reference signal configuration information.

According to the method of the disclosure, the information on reference signal transmission indication includes at least one of: a victim base station Set ID; reference signal configuration information; indication information on initiating transmission of the reference signal; and information of cell on which transmission of the reference signal is initiated.

The method further includes receiving information on interference measurement report from the distributed unit device of the base station, wherein the information on the interference measurement report includes at least one of: information of cell on which the remote interference is detected; and interference measurement result of each victim cell.

The method further includes receiving information on reference signal transmission notification from the distributed unit device of the base station, wherein the information on the reference signal transmission notification includes at least one of: information of cell on which the remote interference is detected; interference measurement result of each victim cell; notification information on the distributed unit device initiating transmission of the reference signal; information of cell on which transmission of the reference signal is initiated; reference signal configuration information; a victim base station Set ID; and response information on initiating transmission of the reference signal.

The method further includes receiving information on a response to stopping transmission of the reference signal from the distributed unit device of the base station, wherein the information on the response to stopping transmission of the reference signal includes at least one of: notification information on the distributed unit device stopping transmission of reference signal; identification information of the reference signal; and response information on stopping transmission of the reference signal.

According to another aspect of the disclosure, a method for a distributed unit device of a base station is provided. The method includes: transmitting information on reception status of a reference signal to a central unit device of the base station; and performing or stopping performing an interference mitigation scheme based on the information on the reception status of the reference signal.

According to the method of the disclosure, the information on the reception status of the reference signal includes at least one of: identification information of the reference signal; indication information on reception of the reference signal; information of cell or frequency on which the reference signal is received; indication information on disappearance of the reference signal; and information of cell or frequency on which the reference signal disappears.

The method further includes: receiving information on reference signal measurement configuration transmitted by the central unit device of the base station; and performing reference signal measurement based on the information on reference signal measurement configuration.

The method further includes: receiving information on an indication of performing interference mitigation scheme transmitted by the central unit device of the base station; and initiating performing the interference mitigation scheme.

According to the method of the disclosure, the information on the reference signal measurement configuration includes at least one of: a measurement method of the reference signal; a reporting threshold or a reporting condition; a threshold for performing interference mitigation scheme; configuration information of interference mitigation scheme; and an aggressor base station Set ID.

According to the method of the disclosure, the information on the interference mitigation scheme performance indication includes at least one of: an aggressor base station Set ID; indication information on performing interference mitigation scheme; configuration information of interference mitigation scheme; and information of cell on which interference mitigation scheme is performed.

The method further includes transmitting information on reference signal measurement report to the central unit device of the base station, wherein the information on the reference signal measurement report includes at least one of: an aggressor base station Set ID; indication information on reception of the reference signal; a request for interference mitigation scheme; information on interference mitigation scheme configured by the distributed unit device; information of cell on which the reference signal is received; and measurement result of each cell on which the reference signal is detected.

The method further includes transmitting information on interference mitigation scheme performance notification to the central unit device of the base station, wherein the information on interference mitigation scheme performance notification includes at least one of: information of cell on which the reference signal is received; measurement result of each cell on which the reference signal is detected; a victim base station Set ID; indication information on reception of the reference signal; notification information on the distributed unit device performing the interference mitigation scheme; information on interference mitigation scheme configured by the distributed unit device; information of cell on which the interference mitigation scheme is performed; an aggressor base station Set ID; information on one or more tracking area identities (IDs)/global base station identities (IDs); and response information on performing the interference mitigation scheme.

The method further includes receiving information on an indication of terminating the interference mitigation scheme transmitted by the central unit device of the base station, wherein the information on the indication of terminating the interference mitigation scheme includes at least one of: indication information on terminating the interference mitigation scheme; identification information of the interference mitigation scheme; and information of cell on which interference mitigation scheme is terminated.

The method further includes transmitting information on notification of terminating the interference mitigation scheme to the central unit device of the base station, wherein the information on the notification of terminating the interference mitigation scheme includes at least one of: notification information on the distributed unit device terminating the interference mitigation scheme; identification information of the interference mitigation scheme; and response information on terminating the interference mitigation scheme.

According to another aspect of the disclosure, a method for a central unit device of a base station is provided. The method includes: receiving information on reception status of a reference signal from a distributed unit device of the base station, such that the distributed unit device of the base station performs an interference mitigation scheme or stops performing the interference mitigation scheme based on the information on the reception status of the reference signal; and transmitting the information on the reception status of the reference signal to the central unit device of the victim base station through a backhaul network.

According to the method of the disclosure, the information on the reception status of the reference signal includes at least one of: identification information of the reference signal; indication information on reception of the reference signal; information of cell or frequency on which the reference signal is received; indication information on disappearance of the reference signal; and information of cell or frequency on which the reference signal disappears.

The method further includes transmitting information on reference signal measurement configuration to the distributed unit device of the base station, such that the distributed unit device of the base station performs reference signal measurement based on the information on the reference signal measurement configuration.

The method further includes transmitting information on an indication of performing the interference mitigation scheme to the distributed unit device of the base station, such that the distributed unit device of the base station initiates performing the interference mitigation scheme.

According to the method of the disclosure, the information on the reference signal measurement configuration includes at least one of: a measurement method of the reference signal; a reporting threshold or a reporting condition; a threshold for performing the interference mitigation scheme; configuration information of the interference mitigation scheme; and an aggressor base station Set ID.

According to the method of the disclosure, the information on the indication of performing the interference mitigation scheme includes at least one of: an aggressor base station Set ID; indication information on performing the interference mitigation scheme; configuration information of the interference mitigation scheme; and information of cell on which the interference mitigation scheme is performed.

The method further includes receiving information on reference signal measurement report from the distributed unit device of the base station, wherein the information on the reference signal measurement report includes at least one of: an aggressor base station Set ID; indication information on reception of the reference signal; a request for interference mitigation scheme; information on interference mitigation scheme configured by the distributed unit device; information of cell on which the reference signal is received; and measurement result of each cell on which the reference signal is detected.

The method further includes receiving information on notification of performing the interference mitigation scheme from the distributed unit device of the base station, wherein the information on the notification of performing the interference mitigation scheme includes at least one of: information of cell on which the reference signal is detected; measurement result per cell on which the reference signal is received; a victim base station Set ID; indication information on reception of the reference signal; notification information on the distributed unit device performing the interference mitigation scheme; information on interference mitigation scheme configured by the distributed unit device; information of cell on which the interference mitigation scheme is performed; an aggressor base station Set ID; information on one or more tracking area identities (IDs)/global base station identities (IDs); and response information on performing the interference mitigation scheme.

The method further includes transmitting information on an indication of terminating the interference mitigation scheme to the distributed unit device of the base station, wherein the information on the indication of terminating the interference mitigation scheme includes at least one of: indication information on terminating the interference mitigation scheme; identification information of the interference mitigation scheme; and information of cell on which the interference mitigation scheme is terminated.

The method further includes receiving information on notification of terminating the interference mitigation scheme transmitted by the distributed unit device of the base station, wherein the information on the notification of terminating the interference mitigation scheme includes at least one of: notification information on the distributed unit device terminating the interference mitigation scheme; identification information of the interference mitigation scheme; and response information on terminating the interference mitigation scheme.

According to another aspect of the disclosure, a distributed unit device of a base station is provided. The distributed unit device includes: a transceiver configured to receive and transmit information; and a controller configured to control the device to receive information on reception status of a reference signal transmitted by a central unit device of the base station and to perform or stop transmission of the reference signal based on the information on the reception status of the reference signal.

According to another aspect of the disclosure, a central unit device of a base station is provided. The central unit device includes: a transceiver configured to receive and transmit information; and a controller configured to control the device to receive information on reception status of a reference signal from a central unit device of an aggressor base station through a backhaul network and to control the device to transmit the information on the reception status of the reference signal to a distributed unit device of the base station, such that the distributed unit device of the base station performs or stops transmission of the reference signal based on the information on the reception status of the reference signal According to another aspect of the disclosure, a distributed unit device of a base station is provided. The distributed unit device includes: a transceiver configured to receive and transmit information; and a controller configured to control the device to transmit information on reception status of a reference signal to a central unit device of the base station and to perform or stop performing an interference mitigation scheme based on the information on the reception status of the reference signal.

According to another aspect of the disclosure, a central unit device of a base station is provided. The central unit device includes: a transceiver configured to receive and transmit information; and a controller configured to control the device to receive information on reception status of a reference signal from a distributed unit device of the base station, such that the distributed unit device of the base station performs or stops performing an interference mitigation scheme based on the information on the reception status of the reference signal, and to transmit the information on the status of the reference signal to a central unit device of a victim base station through a backhaul network.

According to embodiments of the disclosure, for the CU-DU split base station, the CU may exchange essential or optional information for implementing RIM mechanisms with the DU, so as to ensure the RIM mechanisms to be implemented correctly and more optimally.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

DETAILED DESCRIPTION

Figure 1:
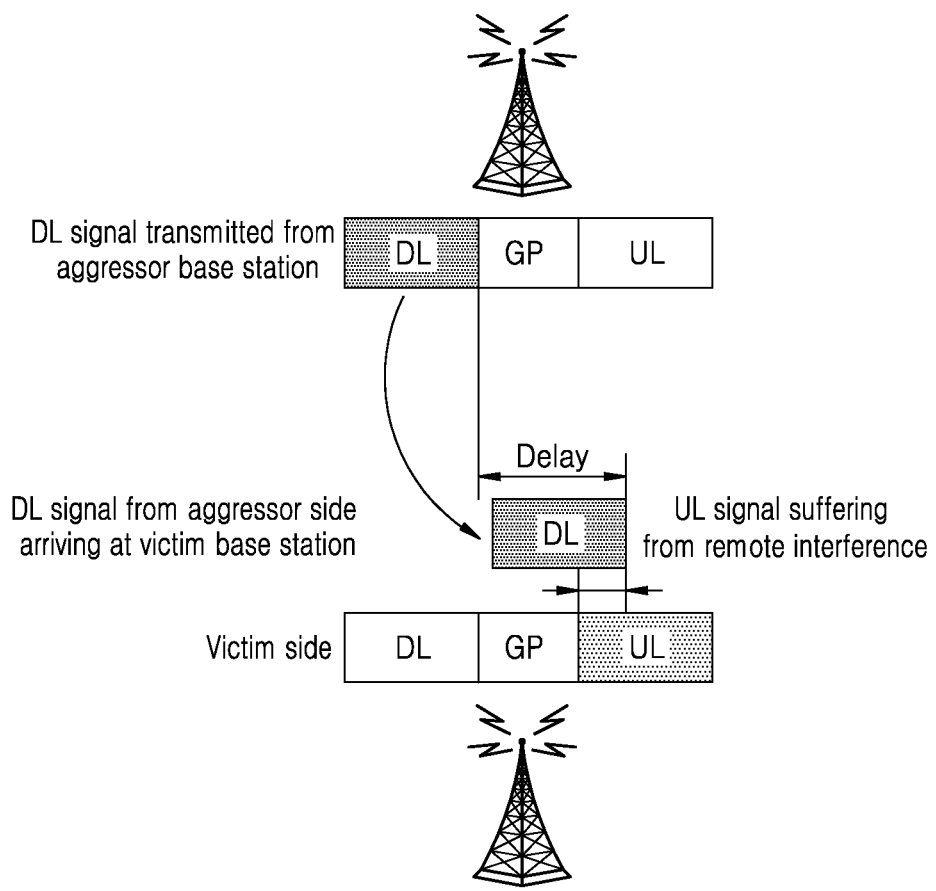
FIG. 1 illustrates a schematic diagram of remote interference generation.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. The following description includes various specific details to assist in that understanding but these are to be regarded as merely exemplary. Accordingly, those of ordinary skill in the art will recognize that various changes and modifications of the various embodiments described herein may be made without departing from the scope of the disclosure as defined in the appended claims. In addition, descriptions of well-known functions and constructions may be omitted for clarity and conciseness.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Additionally, expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit", "manager", "engine", or "device" may refer to a unit which processes at least one function or operation and may be implemented by hardware, software, or a combination of hardware and software.

The message names in the present disclosure are merely examples, and other names may be employed. The information that needs to be transmitted between the CU and the DU may be separately defined in a way of a new message, and may also use a new IE added to the existing message in the existing F1 interface specification 3GPP TS 38.473 (e.g., adding the new IE to a message of gNB-DU Configuration Update or gNB-CU Configuration Update).

Figure 3:
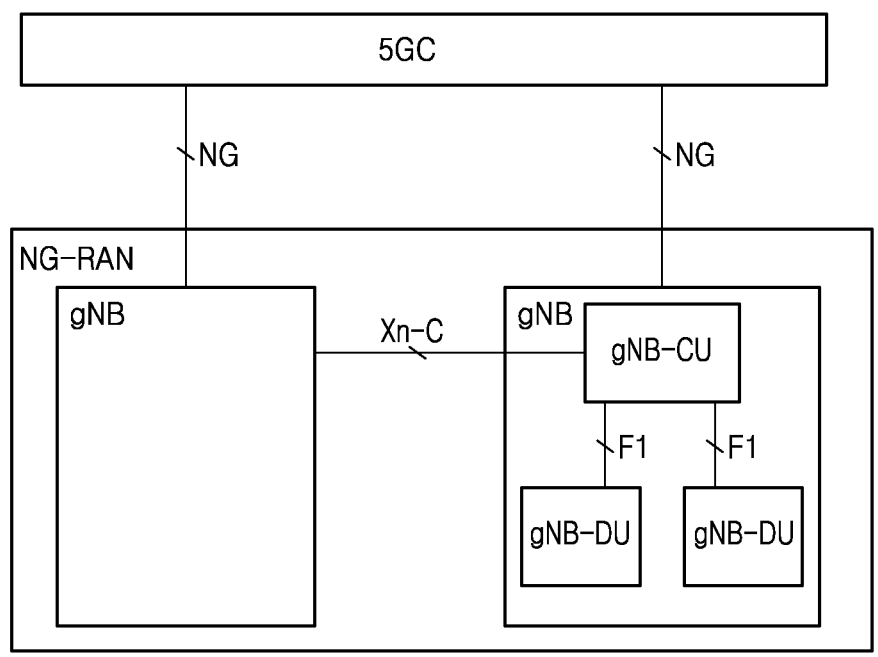
FIG. 3 illustrates a diagram of an NG-RAN architecture including a base station with split CU-DU.

For implementation of the above schemes, only traditional base stations are currently considered. However, in the 5G system, in order to support virtualization of network functions, a base station structure, in which a central unit (CU) and a distributed unit (DU) is split, is defined. That is, one base station may be further divided into a central unit and a distributed unit (referred to as the CU and the DU respectively in the present disclosure). The CU has Radio Resource Control (RRC) layer, Service Data Adaptation Protocol (SDAP) layer, Packet Data Convergence Protocol (PDCP) protocol layer and the like. The DU has Radio Link Control Protocol (RLC) layer, Medium Access Control (MAC) layer, Physical layer and the like. Between CU and DU is a standardized common interface F1. The F1 interface is divided into a control plane F1-C and a user plane F1-U. FIG. 3 shows the structures of the CU and DU. Therefore, in the case of the split CU-DU, considering implementation of the RIM mechanism, more information needs to be interacted between the CU and the DU.

In the prior art, according to the current protocol (TR38.866-g00), the implementation of the RIM mechanism does not consider an architecture of the base station with split CU-DU yet. For example, detection of the remote interference is implemented at the DU side of the local base station, and the relevant information (such as on which cell under which DU the remote interference is detected) is not obtained by the CU, and may be known by the DU which detects the same first. For example, the RIM-RS received by the remote base station is monitored at the DU side thereof, and the CU knows it after the DU reports to the CU. In summary, in order to ensure the correct implementation of the remote interference mitigation mechanism, whether it is implemented at the local victim base station or at the remote aggressor base station, necessary information about the RIM needs to be interacted between the CU and the DU.

The problem to be solved by the present disclosure may include interaction of information between the CU and the DU of the victim base station side to ensure correct implementation of the RIM mechanism.

The problem to be solved by the present disclosure may also include interaction of information between the CU and the DU of the aggressor base station side to ensure correct implementation of the RIM mechanism.

In the 5G NR (New Radio Access) TDD system network, in order to mitigate the interference of a remote aggressor base station (Aggressor gNB) to a local victim base station (Victim gNB) and ensure the reliability of the uplink data reception of the local victim base station, the 3GPP RAN introduces the Remote Interference Management (RIM) research project into 5G Phase II-R16. As shown in FIG. 1, the downlink subframe signal transmitted by the remote aggressor base station is affected by the refraction of the atmospheric ducting, and when arriving at the local victim base station, the downlink subframe signal falls into the uplink subframe period configured for the local base station due to the transmission time delay, so that the interference is generated for reception and demodulation of the uplink subframe information of the local victim base station. Although a single remote aggressor base station has less impact on the local victim base station, if the interference generated by a large number of remote aggressor base stations is superimposed, the SNR around the local victim base station is close to or lower than the minimum SNR required upon reception, thus during the uplink subframe period the uplink data sent by the UE cannot be normally received or the reception performance is degraded, and the error rate is increased. Therefore, the RIM mechanism is introduced to avoid or reduce the remote interference.

Figure 2:
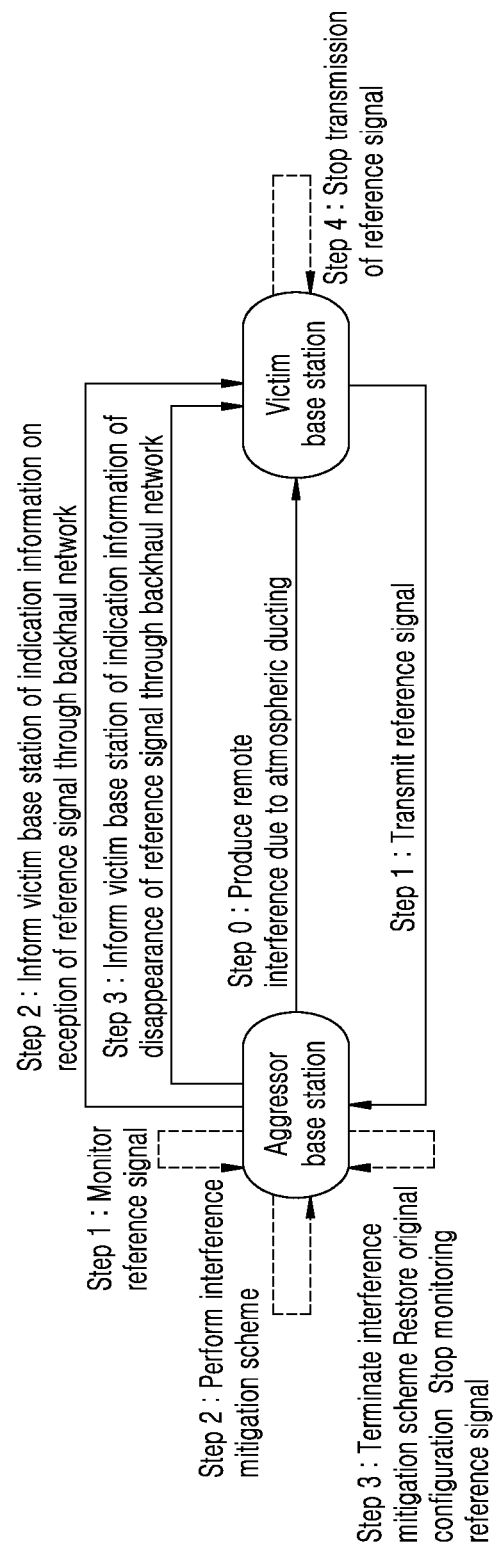
FIG. 2 illustrates a chart of workflow according to RIM framework 2.1.

As shown in FIG. 2, the 3GPP RAN WG1 defines RIM Framework 2.1, and the workflow is as follows.

Step 0: Atmospheric ducting phenomenon happens and the remote interference appears.

Step 1: A local base station detects that the surrounding interference over thermal (IoT) increases beyond a threshold upon reception on the uplink, which means that the local base station experiences the interference from the remote aggressor base station, and the local base station is called a victim base station, and the victim base station may be a gNB, an eNB or other types of base stations. Hereinafter, the gNB is taken as the victim base station for instance, and the method described below is also applicable to other types of base stations. The victim base station (i.e., Victim gNB) reports to an Operation And Management (OAM) system. The OAM groups victim base stations into a group, configures the same Remote Interference Management-Reference Signal (RIM-RS) and requests the local victim base station to transmit it. Meanwhile, the remote aggressor base station (i.e., Aggressor gNB) starts RIM-RS monitoring as configured by the OAM.

Step 2: Upon reception of the RIM-RS, the remote aggressor base station informs the local victim base station of the reception of the RIM-RS through the backhaul network, and the local victim base station continues transmitting the RIM-RS, and the remote aggressor base station applies an interference mitigation scheme after interaction with the OAM, such as solution muting a downlink symbol that generates remote interference to the local victim base station based on a time-domain.

Step 3: Upon no reception of the RIM-RS, the remote aggressor base station informs the local victim base station of the disappearance of the RIM-RS through the backhaul network, and undoes application of the interference mitigation scheme and restores the previous status.

Step 4: The local victim base station stops transmitting the RIM-RS upon the reception of an indication of the disappearance of the RIM-RS.

According to another aspect of the disclosure, a method for performing remote interference detection by a victim base station (Victim gNB) is provided. The method includes the following steps.

Step 1: The DU initiates remote interference measurement.

The DU may perform the measurement according to measurement configuration information transmitted by the CU, and this configuration may be configured by the OAM to the CU, or may be generated by the CU itself. The measurement configuration information includes one or more of the following information:

a measurement method (such as measuring an average value of remote interference noise from which the symbols in the uplink subframes have suffered over a certain period of time);

a reporting threshold or a reporting condition, if the remote interference measurement result of the DU exceeds the threshold, the DU needs to report the measurement result to the CU, or according to the reporting condition, the DU reports the remote interference measurement result to the CU;

a threshold for transmitting RIM-RS, if the measurement result of the DU satisfies the threshold, the DU may initiate transmission of the RIM-RS; and RIM-RS configuration information (it may be configured by the OAM to the CU, or it may be generated by the CU itself which is pre-configured with the Set ID).

Alternatively, the DU may initiate the remote interference measurement by itself according to the characteristics of the remote interference, or the DU may initiate the remote interference measurement as configured by the OAM.

Step 2: The DU transmits a message to the CU, for reporting remote interference detection result or the situation of RIM-RS configuration.

After the DU performs the measurement, according to the measurement configuration transmitted by the CU or the OAM, if it includes a report threshold or a threshold for transmission of RIM-RS, the DU reports the measurement result to the CU. The message carries one or more of the following information:

notification information on DU initiating transmission of a RIM-RS (the DU may decide to transmit the RIM-RS by itself, if the DU obtains the RIM-RS configuration from the OAM or configures the RIM-RS by itself);

information of cell on which the transmission of a RIM-RS is initiated, such as cell identification information (an NR CGI(Cell Global Identifier), or a PCI, or an index) (optional information, the CU stores the information cell on which the RIM-RS is transmitted);

configuration information of RIM-RS (the configuration of the RIM-RS may be configured by the OAM to the DU, or may be generated by the DU itself which is pre-configured with the Set ID);

information of cell on which remote interference is detected, such as cell identification information (an NR CGI, or a PCI, or an index) (optional information, the CU stores the information of the cell on which the remote interference is detected);

interference measurement result of each victim cell (such as an interference noise power value, a number of victim symbols, a signal-to-noise ratio upon demodulation of victim symbols, and the like) (if the CU obtains the RIM-RS configuration from the OAM or configures the RIM-RS by itself and transmits the RIM-RS configuration to the DU, the DU reports this information according to which the CU or the OAM configures appropriate RIM-RS);

a victim base station Set ID (it may be configured by the OAM to the DU, or the DU may be pre-configured with the Set ID).

Step 3: The DU receives a message transmitted by the CU, indication of configuring the RIM-RS and initiating transmission of the RIM-RS. The message includes one or more of the following information:

indication information on initiating transmission of RIM-RS;

indication information on continuing transmission of RIM-RS;

an indication of reception of RIM-RS;

an indication of disappearance of RIM-RS;

indication information on stopping transmission of RIM-RS;

RIM-RS configuration information (it may be configured by the OAM to the CU, or it may be generated by the CU itself which is pre-configured with the Set ID);

a victim base station Set ID (it may be configured by the OAM to the CU, or the CU may be pre-configured with the Set ID);

information of cell on which transmission of RIM-RS is initiated, such as cell identification information (a NR CGI, or a PCI, or an index) (optional information, if the CU has already known the information of cell on which the remote interference is detected at Step 1, the CU may directly indicate the information of the cell on which RIM-RS is transmitted);

information of cell on which transmission of RIM-RS is continued, such as cell identification information (a NR CGI, or a PCI, or an index) (optional information, if the CU has already known the information of the cell on which transmission of RIM-RS is initiated, the CU may directly indicate the information of the cell on which transmission of RIM-RS is continued); and information of cell on which transmission of RIM-RS is stopped, such as cell identification information (a NR CGI, or a PCI, or an index) (optional information, if the CU has already known the information of the cell on which transmission of the RIM-RS is initiated, the CU may directly indicate the information of the cell on which transmission of the RIM-RS is stopped).

Step 4: The DU transmits or stops transmitting the RIM-RS. It may transmit a message to the CU for indicating that the DU has initiated or stopped transmitting the RIM-RS. The message includes one of the following information:

response information on initiating transmission of RIM-RS (if the CU indicates transmission of the RIM-RS to the DU, the DU informs the CU through this information when the DU succeeds or fails in performing);

response information on stopping transmission of RIM-RS (if the CU indicates stopping transmission of the RIM-RS to the DU, the DU informs the CU through this information when the DU succeeds in performing); and notification information on DU stopping transmission of RIM-RS (if the DU decides to stop transmission of the RIM-RS by itself, the DU informs the CU through this information when the DU succeeds in performing).

The DU may transmit the RIM-RS on the cell specified by the Uu interface (which may be decided by the DU or specified by the CU, the cell on which the remote interference is detected or the cell on which the remote interference is not detected) according to the configuration information of the RIM-RS and indication information on initiating transmission of the RIM-RS obtained at Step 3. The DU may then transmit the response information on initiating transmission of the RIM-RS to the CU.

Alternatively, the DU obtains the victim base station set ID and the configuration information of the RIM-RS from the OAM through step 2 or utilizes the victim base station set ID and the configuration information of the RIM-RS pre-configured. When the detection result of the remote interference is greater than the threshold for transmitting the RIM-RS (if a threshold configuration is present), the DU decides to transmit the RIM-RS on the cell specified by the Uu interface (the cell on which the remote interference is detected or the cell on which the remote interference is not detected, which is decided by the DU) by itself. The DU then transmits to the CU notification information on the DU initiating transmission of the RIM-RS by using Step 2.

Alternatively, the DU obtains the indication information on continuing transmission of the RIM-RS through Step 3, and continues transmitting the RIM-RS on the cell specified by the Uu interface (the cell on which the remote interference is detected or the cell on which the remote interference is not detected, which may be decided by the DU or specified by the CU).

Alternatively, the DU obtains the indication information on reception of the RIM-RS through Step 3, and continues transmitting the RIM-RS on the cell specified by the Uu interface (the cell on which the remote interference is detected or the cell on which the remote interference is not detected, which may be decided by the DU or specified by the CU).

Alternatively, the DU obtains the indication information on stopping transmission of the RIM-RS through Step 3, and stops transmitting the RIM-RS on the cell specified by the Uu interface (it may be decided by the DU or specified by the CU). The DU may then transmit the response information on stopping transmission of the RIM-RS to the CU.

Alternatively, the DU obtains the indication information on disappearance of the RIM-RS through Step 3, and stops transmitting the RIM-RS on the cell specified by the Uu interface (it may be decided by the DU or specified by the CU). The DU may then transmit the notification information on stopping transmission of the RIM-RS to the CU.

According to another aspect of the disclosure, a method for removing remote interference by an aggressor base station (Aggressor gNB) is provided. The method includes the following steps.

Step 1: The DU initiates a RIM-RS detection.

The DU may initiate the RIM-RS detection according to measurement configuration information received from the CU. The information on the RIM-RS measurement configuration may be configured by the OAM to the CU, or may be transmitted to the CU of the aggressor base station by the victim base station by using the previously set aggressor base station Set ID and the victim base station Set ID through a backhaul signaling after the victim base station detects the remote interference. The configuration information includes one or more of the following information:

- a measurement method (periodically monitoring signals at specified time-frequency locations);
- a reporting threshold or a reporting condition, if the RIM-RS measurement result of the DU exceeds the threshold, the DU needs to report the measurement result to the CU, or according to the reporting condition, the DU reports the RIM-RS measurement result to the CU;
- a threshold for performing interference mitigation scheme, if the RIM-RS measurement result of the DU satisfies the threshold, the DU may initiate performing the interference mitigation scheme;
- configuration information of interference mitigation scheme, such as one or more interference mitigation schemes below (it does not exclude interference mitigation scheme newly incorporated into the specification as the research progresses deeper) (acquired by the CU through interaction with the OAM, or pre-configured by the CU);
  - time-domain solutions: such as muting downlink symbols that cause interference
  - frequency-domain solutions: such as changing transmission frequency band BWP
  - power-domain solutions: such as reducing transmission power of downlink symbols that cause interference
  - spatial-domain solutions: such as changing the beam parameter, down-tilt
- an aggressor base station Set ID (acquired by the CU through interaction with the OAM, or pre-configured by the CU).

Alternatively, DU directly initiates the RIM-RS detection by itself according to the configuration from the OAM.

After the DU detects the RIM-RS, if the DU may decide to configure the interference mitigation mechanism by itself, or the DU may obtain the interference mitigation mechanism from the OAM, the DU performs the interference mitigation mechanism, and the DU transmits the message at Step 2 to the CU to indicate that the RIM-RS has been received, and inform the CU of the interference mitigation mechanism which has started to be performed.

After the DU detects the RIM-RS, if the DU is not configured with the interference mitigation mechanism, the DU may transmit a message to indicate to the CU that the RIM-RS has been received, and request for the interference mitigation mechanism.

Step 2: The DU transmits a message to the CU, for informing information on detection status of the RIM-RS and information on configuration application of the interference mitigation scheme. The message carries one or more of the following information:

- an indication of reception of RIM-RS (optional information, because when only the base station Set ID or the victim base station Set ID is present, it also implicitly indicates that the RIM-RS is detected);
- an indication of disappearance of RIM-RS (optional information, if it is used that detection of the RIM-RS is implicitly indicated when only the base station Set ID or the victim base station Set ID is present, it also can be used that when there is no the base station Set ID or the victim base station Set ID, disappearance of the RIM-RS is implicitly indicated);
- a base station Set ID or a victim base station Set ID (acquired by demodulation of the RIM-RS) (if it is used that detection of the RIM-RS is implicitly indicated when only the base station Set ID or the victim base station Set ID is present, it also can be used that when there is no the base station Set ID or the victim base station Set ID, disappearance of the RIM-RS is implicitly indicated);
- notification information on DU performing the interference mitigation scheme;
- information on interference mitigation scheme configured by DU, such as one or more interference mitigation schemes below (it does not exclude the interference mitigation scheme newly incorporated into the specification as the research progresses deeper);
  - time-domain solutions: such as muting downlink symbols that cause interference
  - frequency-domain solutions: such as changing transmission frequency band BWP
  - power-domain solutions: such as reducing transmission power of downlink symbols that cause interference
  - spatial-domain solutions: such as changing the beam parameter, down-tilt
- information of cell on which interference mitigation scheme is performed, such as cell identification information (a NR CGI, or a PCI, or an index) (optional information, the CU stores the information of cell on which interference mitigation scheme is performed);
- a request for interference mitigation scheme (optional information, when the measurement result information of the RIM-RS at the DU side is carried, it may also implicitly represents a request for the interference mitigation scheme, and the CU selects the appropriate interference mitigation scheme according to the measurement result or the CU obtains the interference mitigation scheme through interaction with the OAM) (if the DU is configured with an interference mitigation scheme, no further requests are required);
- information of cell on which RIM-RS is detected, such as cell identification information (an NR CGI, or a PCI, or an index) (optional information, the CU stores the information cell on which the RIM-RS is detected) (or information of frequency on which the RIM-RS is detected);
- measurement result of the cell on which the RIM-RS is detected (such as a RIM-RS power value, time delay, and the like) (if the DU is not configured with the interference mitigation scheme and needs to acquire it from the CU, this information is reported to the CU, and the CU configures the appropriate interference mitigation mechanism according to this information);
- an aggressor base station Set ID (acquired by the CU through interaction with the OAM, or pre-configured by the DU. When an alternative backhaul Solution 1 mentioned in the specification TR38.866 is used to transmit the information on detection or disappearance of the RIM-RS to the victim base station, if the information has not been notified to the CU previously by other means such as the F1 Setup procedure, or if the information is updated even though the information has been notified previously, the CU is notified of this information); and information on one or more tracking area identities (IDs)/global base station identities (IDs) (the DU interacts with the OAM and makes a query from the OAM to obtain information on one or more tracking area identities (IDs)/global base station identities (IDs) to which the victim base station Set ID is mapped, if an alternative Solution 2 mentioned in the specification TR38.866 is used to transmit the information on detection or disappearance of the RIM-RS to the victim base station through the backhaul network, the CU is notified of this information).

If the CU of the aggressor base station obtains the indication of reception or disappearance of the RIM-RS, it informs the indication of reception or disappearance of the RIM-RS of the base stations in the aggressor base station set using the backhaul signaling mechanism.

Step 3: The DU receives a message transmitted by the CU, and the message carries configuration information of the interference mitigation mechanism of the CU (the interference mitigation mechanism may be configured by the OAM to the CU, or may be also decided by the CU itself). The message includes one or more of the following:

an aggressor base station Set ID (acquired by the CU through interaction with the OAM, or pre-configured by the CU);

configuration information of interference mitigation scheme, such as one or more interference mitigation schemes below (it does not exclude the interference mitigation scheme newly incorporated into the specification as the research progresses deeper) (acquired by the CU through interaction with the OAM, or pre-configured by the CU):

time-domain solutions: such as muting downlink symbols that cause interference frequency-domain solutions: such as changing transmission frequency band BWP power-domain solutions: such as reducing transmission power of downlink symbols that cause interference spatial-domain solutions: such as changing the beam parameter, down-tilt indication information on performing interference mitigation scheme;

indication information on terminating interference mitigation scheme (when the CU receives the information of disappearance of the RIM-RS reported by the DU, if the CU controls to stop the interference mitigation scheme, the CU transmits this message to indicate stopping the interference mitigation scheme to the DU);

information of cell on which interference mitigation scheme is performed, such as cell identification information (a NR CGI, or a PCI, or an index) (optional information, if the CU has already known the information of the cell on which the RIM-RS is received at Step 2, it may directly indicate the information of the cell on which the interference mitigation scheme is performed); and information of cell on which interference mitigation scheme is terminated, such as cell identification information (a NR CGI, or a PCI, or an index) (optional information, if the CU has already known the information of the cell on which the interference mitigation scheme is initiated, it may directly indicate the information of the cell on which the interference mitigation scheme is terminated).

Step 4: The DU starts or terminates performing the interference mitigation scheme. It may transmit a message to the CU for indicating that the DU has started or terminated performing the interference mitigation scheme. The message includes one of the following information:

response information on performing interference mitigation scheme (the CU indicates initiation of performing the interference mitigation scheme to the DU, and the DU informs the CU through this information when the DU succeeds or fails in performing);

response information on terminating interference mitigation scheme (the CU indicates to the DU termination of performing the interference mitigation scheme, and the DU informs the CU through this information when the DU succeeds in terminating the performance); and notification information on DU terminating interference mitigation scheme (the DU decides to terminate performing the interference mitigation scheme by itself, and the DU informs the CU through this information when the DU succeeds in terminating the performance).

According to Step 2, after the DU detects the RIM-RS, the interference mitigation scheme is obtained by the DU from the OAM, and the DU may perform the interference mitigation scheme on the cell specified by the DU (the cell on which the RIM-RS is detected or the cell on which the RIM-RS is not detected) if the measurement result is greater than the threshold for performing the interference mitigation scheme. The DU then transmits the notification information on the DU performing the interference mitigation scheme to the CU, and may also carry the information on the interference mitigation scheme configured by the DU to the CU. If the measurement result does not satisfy the threshold for performing the interference mitigation scheme, the DU reports the interference mitigation scheme configured by the DU and the situation of detecting the RIM-RS to the CU through Step 2, and then the CU transmits the message to the CU through Step 3, for indicating start of perform the interference mitigation scheme to the DU. Thus, the DU performs the interference mitigation scheme on the cell specified by the DU (the cell on which the RIM-RS is detected or the cell on which the RIM-RS is not detected, or it may be directly specified by the CU). Then the DU may transmit response information on performing interference mitigation scheme to the CU.

According to Step 3, after the DU detects the RIM-RS, the interference mitigation mechanism is obtained by the DU from the CU, and the DU may perform the interference mitigation scheme on the cell specified by the DU (it may be the cell on which the RIM-RS is detected or the cell on which the RIM-RS is not detected decided by the DU, or it may be directly specified by the CU). Then the DU may transmit response information on performing the interference mitigation scheme to the CU.

According to Step 2, after the DU detects disappearance of the RIM-RS, the DU may terminate performing the interference mitigation scheme on the specified cell (the cell on which the RIM-RS is detected or the cell on which the RIM-RS is not detected), and transmit the indication of disappearance of the RIM-RS and notification information on the DU terminating the interference mitigation scheme to the CU through Step 2. Alternatively, after informing the CU of the indication of disappearance of the RIM-RS through Step 2, the CU issues the indication of terminating the interference mitigation scheme to the DU through Step 3, and then the DU may transmit the response information on terminating the interference mitigation scheme to the CU.

The following description in the embodiments refers to the specialized names and explanations as follows:

1. Operation And Management (OAM): is an operation, maintenance and management entity and system, and is specifically responsible for the RIM-RS configuration and measurement configuration, configuration of a Set Identification (ID), and configuration of some interference mitigation schemes, etc.

2. Access and Mobility Management Function (AMF): is a network element of the 5G core network, is responsible for access and mobility management of the 5G base station. The 5G base station is connected to the AMF through an NG-C interface.

3. Identification information of reference signal: indicates a Identification (ID) information of a victim base station Set, i.e., a victim base station Set ID, or is identified by a base station Set Identification (ID) or a Set ID, with each Set ID corresponding to one RIM-RS. Of course, that the identification information of the reference signal is indicated in other manners, such as a reference signal ID or index, etc., is not excluded.

4. Reference signal: a reference signal mentioned herein specifically indicates a RIM-RS (remote interference management-reference signal), with the Set ID information being encoded in the reference signal and transmitted in a specified sequence and time-frequency resources.

5. Identification information of interference mitigation scheme: indicates an interference mitigation scheme adopted upon reception of a certain reference signal, which may be identified by the relationship with the Set ID of the victim base station, the base station Set ID, or the Set ID, with each Set ID corresponding to one interference mitigation scheme. Of course, that the identification information of the interference mitigation scheme is indicated in other manners, such as an ID or an index of the interference mitigation scheme, etc., is not excluded.

6. Tracking area identity (ID)/global base station identity (ID): namely, Tracking Area Identity (TAI)/Global gNB ID.

Figure 4:
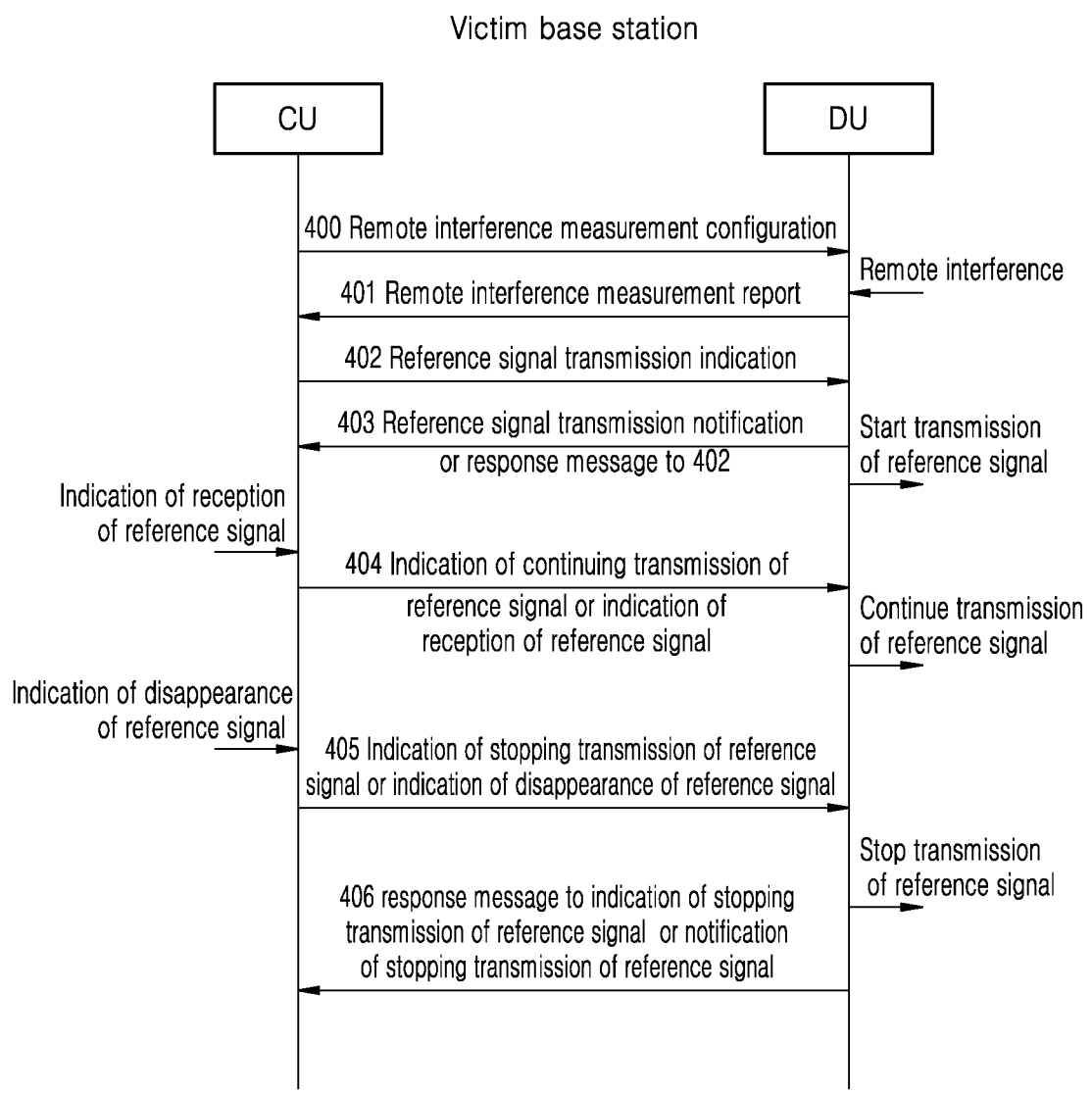
FIG. 4 illustrates a signaling flowchart at a victim base station side according to an embodiment of the present disclosure.

FIG. 4 describes a first embodiment of the present disclosure. This embodiment describes a process in which a victim base station performs the remote interference detection. The victim base station (Victim gNB) is split into a base station's centralized control unit (CU) and a base station's distributed unit (DU), and one CU may be connected to a plurality of DUs. The base station may be a 5G base station, or an LTE base station, or a base station of other access modes. This embodiment takes a 5G base station, a gNB, as an example, if it is used in other systems, the corresponding interfaces and message names are also changed correspondingly. It should be noted that not all of the following steps are necessary to be performed, and all or part of the steps may be performed depending on different cases, for example, in which whether the OAM configuration is on the DU or on the CU.

Step 400: The CU of the victim base station transmits, to the DU, a message of remote interference measurement configuration, for configuring the DU to perform the remote interference measurement.

The remote interference measurement configuration may be configured by the OAM to the CU, or may be generated by the CU itself. The DU receives the message for configuring the DU to perform the remote interference measurement transmitted by the CU, and the message carries measurement configuration information, including one or more of the following information:

a measurement method (such as measuring an average value of remote interference noise from which the symbols in the uplink subframes have suffered over a certain period of time);

a reporting threshold or a reporting condition. If the remote interference measurement result of the DU exceeds the threshold, the DU needs to report the measurement result to the CU, or according to the reporting condition, the DU reports the remote interference measurement result to the CU;

a threshold for transmission of the RIM-RS. If the measurement result of the DU satisfies the threshold, the DU may start transmission of the RIM-RS; and RIM-RS configuration information (it may be configured by the OAM to the CU, or it may be generated by the CU itself which is pre-configured with the Set ID).

Alternatively, for detection of the remote interference, the DU may perform analysis of interference characteristics (one or more cells of the DU monitor at the air interface that the symbols in the uplink subframe are suffering from the thermal noise interference (IoT), and exhibit a status in which as the symbols spread on time domain, the noise power gradually decreases from high to low, which shows that the noise is caused by the remote interference), thus the DU may initiate the measurement configuration by itself, and there is no need for the CU to transmit a message to trigger the DU to perform the remote interference measurement, or the DU may acquire the measurement configuration through the OAM to start the remote interference detection, that is, step 400 is not necessary to be performed.

The DU may pre-configure the reporting threshold for the remote interference, or acquire it from the CU at step 400. If the DU detects that the remote interference exceeds the set reporting threshold (this threshold may be an absolute value of the remote interference such as in unit of dBm, or a relative value such as the minimum signal-to-noise ratio (SNR) required for uplink demodulation), the DU will report to the CU that the remote interference is detected.

Step 401: The DU of the victim base station transmits, to the CU of the base station, a message of remote interference measurement report, for reporting that the remote interference is detected.

When the DU detects the remote interference, the DU transmits message 401 to the CU to report the situation of the remote interference. The message 401 carries one or more of the following information:

information of cell on which remote interference is detected, such as cell identification information (an NR CGI(Cell Global Identifier), or a PCI, or an index) (optional information, the CU stores the information of the cell on which the remote interference is detected);

interference measurement result of each victim cell (such as an interference noise power value, a number of victim symbols, a signal-to-noise ratio upon demodulation of victim symbols, and the like).

Of course, when the DU reports the situation of the remote interference, the above specific information may not be included, and the DU reports to the CU only the situation that the remote interference is detected by the DU. In a case where the remote interference result detected by the DU does not meet the threshold for transmission of the RIM-RS, after the DU reports that the remote interference is detected, if the DU does not obtain the RIM-RS configuration information through step 400, it will wait for the CU to configure the RIM-RS, and then start transmission of the RIM-RS. If the DU obtains the RIM-RS configuration information, the DU starts transmission of the RIM-RS after receiving an indication from the CU.

Step 402: The CU of the victim base station transmits, to the DU of the base station, a message of reference signal transmission indication, for informing the DU to initiate transmission of the RIM-RS.

The CU receives the detection report transmitted by the DU, and the CU decides to initiate transmission of the RIM-RS and transmits a message to the DU, for informing the DU of initiation of transmission of the RIM-RS. If the OAM configures the RIM-RS information on the CU, the message at step 402 may further carry the RIM-RS configuration information indicating time-frequency resources required for transmission of the RIM-RS, or may also include DU and information of the cell on which the RIM-RS is transmitted. The message 402 carries one or more of the following information:
- a victim base station Set ID (it may be configured by the OAM to the CU, or it may be generated by the CU itself which is pre-configured with the Set ID. If the configuration information is updated, the DU is notified);
- RIM-RS configuration information (it may be configured by the OAM to the CU, or it may be generated by the CU itself which is pre-configured with the Set ID. If the configuration information is updated, the DU is notified);
- indication information on initiating transmission of a RIM-RS; and
- information of cell on which transmission of a RIM-RS is initiated, such as cell identification information (a NR CGI, or a PCI, or an index) (optional information, if the CU has known the information of the cell on which the remote interference is detected at step 401, the CU may directly indicate the information of the cell on which the RIM-RS is transmitted).

After the DU receives the indication from the CU, it transmits the RIM-RS on the cell specified by the CU by using the configured time-frequency resources. Alternatively, if the CU does not specify the information of the cell on which the RIM-RS is transmitted, the DU decides to transmit the RIM-RS by using the configured time-frequency resources on the cell that the remote interference is detected or on the cell that the remote interference is not detected.

Step 403: The DU of the victim base station transmits, to the CU of the base station, a message of reference signal transmission notification, for informing the CU of the message that the DU has initiated transmission of the RIM-RS.

If the DU may decide to initiate transmission of the RIM-RS by itself, that is, the CU configures the RIM-RS configuration information and the threshold for transmission of the RIM-RS at step 400, or the OAM configures the threshold for transmission of the RIM-RS by the DU and the RIM-RS configuration information, the remote interference result detected by the DU satisfies the threshold for transmission of the RIM-RS, and the DU decides to start transmission of the RIM-RS, steps 401 and 402 may not be performed. It directly proceeds from step 400 to step 403 to be performed. Alternatively, if the threshold for transmission of RIM-RS is not configured, after detecting the remote interference, the DU may directly decides information such as the RIM-RS configuration by itself or acquire information such as the RIM-RS configuration through interacting with the OAM, and directly initiates transmission of the RIM-RS. The DU may use the message at step 403 to inform the CU of the RIM-RS configuration information decided by the DU (or configured by the OAM to the DU). The message at step 403 carries one or more of the following information:
- information of cell on which remote interference is detected, such as cell identification information (an NR CGI, or a PCI, or an index) (optional information, the CU stores information of cell on which remote interference is detected);
- interference measurement result of each victim cell (optional information, such as an interference noise power value, a number of victim symbols, a signal-to-noise ratio upon demodulation of victim symbols, and the like);
- notification information on start of transmission of the RIM-RS by DU;
- information of cell on which transmission of a RIM-RS is initiated, such as cell identification information (an NR CGI, or a PCI, or an index) (optional information, the CU stores the information of the cell on which the RIM-RS is transmitted);
- RIM-RS configuration information (the RIM-RS configuration may be configured by the OAM to the DU, or may be generated by the DU itself which is pre-configured with the Set ID. If the configuration information is updated, the DU is notified);
- a victim base station Set ID (it may be configured by the OAM to the DU, or the Set ID may pre-configured to the DU. If the information is updated, the DU is notified).

When one DU discovers the remote interference, in order to improve the signal energy of transmission of the RIM-RS, it may be necessary for DUs near the DU to also transmit the same RIM-RS signal, the DU informs the CU of the RIM-RS configuration information decided by the DU (or configured by the OAM to the DU), and the CU needs to forward the RIM-RS configuration information to other DUs. Alternatively, when one DU discovers the remote interference, in order to improve the signal energy of transmission of the RIM-RS, it may be necessary for DUs near the DU to also transmit the same RIM-RS signal, the DU informs the CU that this DU discovers the remote interference, the CU decides the RIM-RS configuration information (or is configured with the RIM-RS configuration information by the OAM) and transmits the RIM-RS configuration information to all of corresponding DUs.

If the RIM-RS configuration information is configured by the CU to the DU at step 402, and/or the DU initiates the transmission of the RIM-RS based on the message at step 402, this message may be a response message to step 402. In this case, the message at step 403 includes one or more of the following information:
- response information on initiating of transmission of RIM-RS (if the CU indicates transmitting the RIM-RS to the DU, the DU informs the CU through this information after the DU succeeds or fails in performing the transmission).

Since there are multiple DUs in the same area that detect the remote interference and some of the DUs may be deployed under CUs of different base stations, the DUs that detect the remote interference, together with the CUs to which the DUs are connected, perform the above steps, and then the DUs get the same victim base station Set ID and the same RIM-RS configuration information, and initiate transmission of the RIM-RS.

When the DU detect the remote interference, the remote interference may be generated by remote aggressor base stations in different areas, and thus their interference characteristics may be different (such as different interference bands), so that the DU or the CU or the OAM may allocate multiple different RIM-RS configuration information and different Set IDs to the DU by analyzing interference measurement results, and then the DU simultaneously transmits multiple RIM-RSs at the air interface.

The aggressor base station generates the remote interference to the victim base station through the atmospheric ducting phenomenon. Due to the channel reciprocity, the aggressor base station may also receive the RIM-RS transmitted by the victim base station through the atmospheric ducting phenomenon. When the aggressor base station detects the RIM-RS, it starts to perform the interference mitigation scheme, and then sends back indication information on reception of the RIM-RS to the victim base station through a backhaul network. The indication information on reception of the RIM-RS is first received by the CU of the victim base station, and step 404 needs to be triggered to inform the DU.

Step 404: The CU of the victim base station transmits an indication message of continuing transmission of reference signal or indication message of reception of reference signal to the DU, for indicating the DU to continue transmitting the RIM-RS.

After the CU of the victim base station receives status information indicating reception of the RIM-RS forwarded from the backhaul network, the CU may transmit a message to the DU, for indicating to the DU the status of reception of the RIM-RS, and then the DU decides to continue transmitting the RIM-RS, or the CU directly indicates continuing transmission of the RIM-RS to the DU, so as to monitor when the atmospheric ducting phenomenon disappears. If a mechanism at the DU side is that the RIM-RS continues being transmitted until an indication of disappearance of RIM-RS or indication information on stopping transmission of RIM-RS is received, this indication message is not mandatory, because the DU has already been in the status of transmitting the RIM-RS. If there is a corresponding timer mechanism at the DU side, in which if an indication of reception of the RIM-RS or indication information on continuing transmission of the RIM-RS has not been received when the timer expires, the DU will stop transmitting the RIM-RS, then the indication message is mandatory. The message includes at least one of the following:
  identification information of RIM-RS;
  indication information on reception of RIM-RS (if the DU simultaneously transmits multiple RIM-RSs of different Set IDs, it is necessary to indicate which Set ID the RIM-RS corresponding to is received by the aggressor base station, that is, carrying the identification information of the RIM-RS);
  indication information on continuing transmission of the RIM-RS (if the DU simultaneously transmits multiple RIM-RSs of different Set IDs, it is necessary to indicate which Set ID the RIM-RS corresponding to continues being transmitted, that is, carrying the identification information of the RIM-RS); and
  information of cell on which transmission of a RIM-RS continues, such as cell identification information (a NR CGI, or a PCI, or an index) (optional information, if the CU has already known the information of the cell on which transmission of the RIM-RS is initiated, the CU may directly the information of the cell on which transmission of the RIM-RS continues).

After the DU obtains the status information on reception of the RIM-RS from the CU, the DU knows on which cells the RIM-RS is being transmitted, and the DU may decide that the RIM-RS continues being transmitted on these cells.

If the atmospheric ducting phenomenon disappears, the aggressor base station will not receive the RIM-RS transmitted by the victim base station. When the aggressor base station does not detect the RIM-RS, it terminates performance of the interference mitigation scheme, and then send back indication information on disappearance of the RIM-RS to the victim base station through the backhaul network. The indication information on disappearance of the RIM-RS is first received by the CU of the victim base station, and step 405 needs to be triggered to inform the DU.

Step 405: The CU of the victim base station transmits an indication message of stopping transmission of the reference signal or an indication message of disappearance of the reference signal to the DU, for indicating the DU to stop transmitting the RIM-RS.

When the CU of the victim base station receives status information indicating disappearance of the RIM-RS forwarded from the AMF, which indicates that the atmospheric ducting phenomenon disappears, the CU needs to transmit the message of disappearance of the RIM-RS to the DU, or directly indicates stopping transmission of the RIM-RS to the DU. The message includes at least one of the following:
  identification information of RIM-RS;
  indication information on disappearance of RIM-RS (if the DU simultaneously transmits multiple RIM-RSs of different Set IDs, it is necessary to indicate which Set ID the RIM-RS corresponding to is not received at the aggressor base station, that is, carrying the identification information of the RIM-RS);
  indication information on stopping transmission of RIM-RS (if the DU simultaneously transmits multiple RIM-RSs of different Set IDs, it is necessary to indicate which Set ID the RIM-RS that stops being transmitted is corresponding to, that is, carrying the identification information of the RIM-RS);
  information of cell on which transmission of a RIM-RS stops, such as cell identification information (a NR CGI, or a PCI, or an index) (optional information, if the CU has already known the information of the cell on which transmission of the RIM-RS is initiated, the CU may directly indicate the information of the cell on which transmission of the RIM-RS stops).

After the DU obtains status information on disappearance of the RIM-RS from the CU, the DU knows on which cells the RIM-RS is being transmitted, and the DU may decide to stop transmitting the RIM-RS, and then may transmit a response message to inform the CU.

Step 406: The DU of the victim base station transmits, to the CU, a response message of an indication of stopping transmission of the reference signal, for indicating that the DU has stopped transmitting the RIM-RS.

If the message at step 405 carrying the indication information on disappearance of the RIM-RS is transmitted to the DU, after stopping transmission of the RIM-RS, the DU may transmit notification information on stopping transmission of the RIM-RS to the CU. The message at step 406 includes at least one of the following information:
  notification information on DU stopping transmission of RIM-RS (if the DU simultaneously transmits multiple RIM-RSs of different Set IDs, it is necessary to indicate which Set ID the RIM-RS that stops being transmitted is corresponding to, that is, carrying the identification information of the RIM-RS); and
  identification information of RIM-RS.

If the message at step 405 carrying the indication information on stopping transmission of the RIM-RS is transmitted to the DU, after stopping transmission of the RIM-RS, the DU may transmit a response message to the CU to indicate a friendly process of termination of stopping transmission of the RIM-RS. The message at step 406 includes at least one of the following information:

response information on stopping transmission of RIM-RS (if the DU simultaneously transmits multiple RIM-RSs of different Set IDs, it is necessary to indicate which Set ID the RIM-RS that has been stopped being transmitted is corresponding to, that is, carrying the identification information of the RIM-RS); and identification information of RIM-RS.

Steps 401 to 406 in FIG. 4 may be performed in the order shown in FIG. 4, or may be performed in other orders. The above individual step may be performed separately, or may be performed in combination of any two or more steps.

In an embodiment, only step 404 is performed. Further, the step may be performed when the DU of the victim base station is connected to the OAM, or the CU of the victim base station is connected to the OAM.

In an embodiment, only step 405 is performed. Further, the step may be performed when the DU of the victim base station is connected to the OAM, or the CU of the victim base station is connected to the OAM.

In an embodiment, steps 405 and 406 are performed. Further, the steps may be performed when the DU of the victim base station is connected to the OAM, or the CU of the victim base station is connected to the OAM.

In an embodiment, only step 403 for reference signal transmission notification is performed. Further, this step may be performed when the DU of the victim base station is connected to the OAM.

In an embodiment, steps 401 and 402 are performed. Further, the steps may be performed when the DU of the victim base station is connected to the OAM, or the CU of the victim base station is connected to the OAM.

In an embodiment, steps 401, 402, and 403 are performed. Further, the steps may be performed when the DU of the victim base station is connected to the OAM, or the CU of the victim base station is connected to the OAM.

Figure 5:
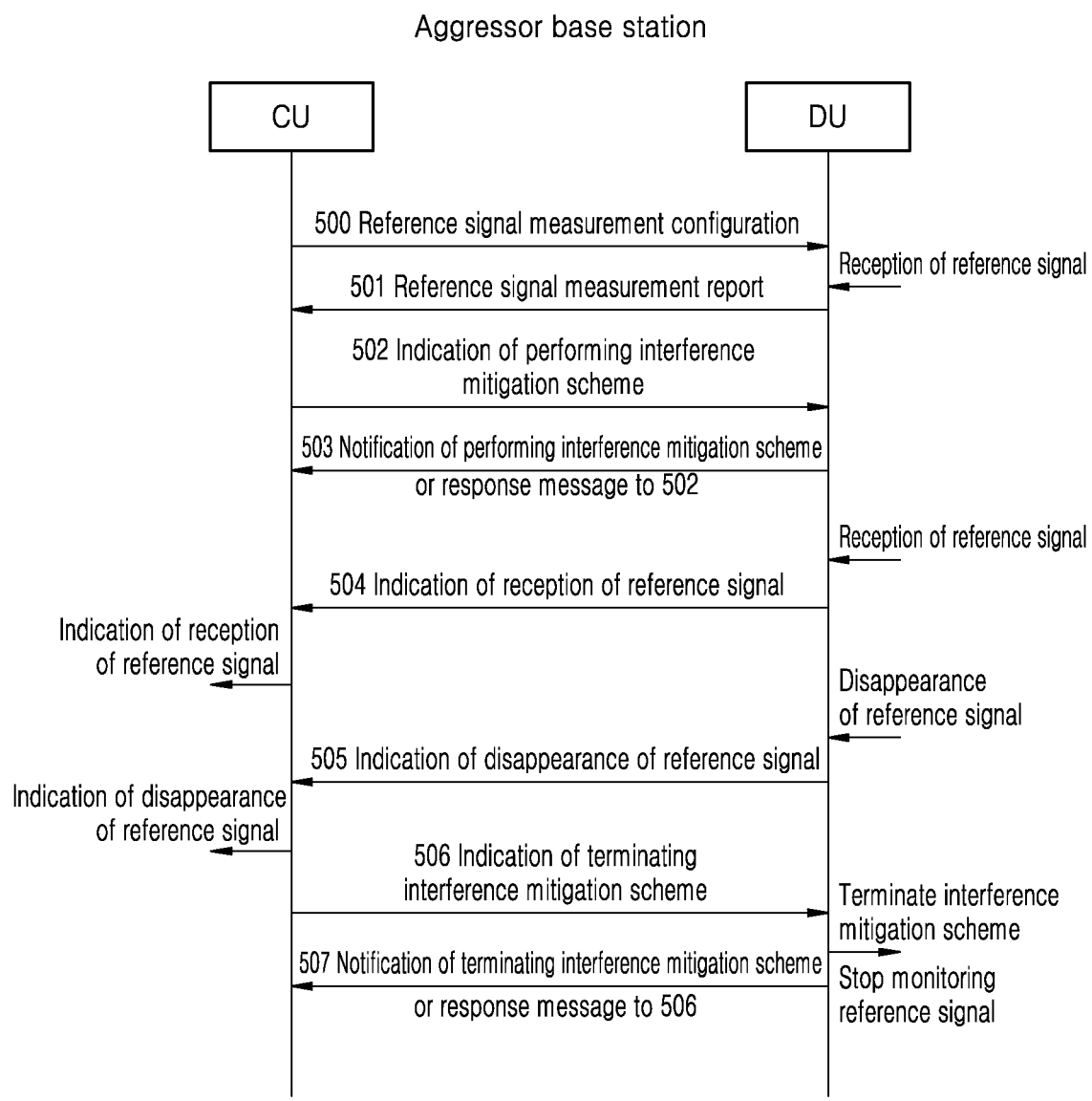
FIG. 5 illustrates a signaling flowchart at an aggressor base station side according to an embodiment of the present disclosure.

FIG. 5 describes a second embodiment of the present disclosure. This embodiment describes a process in which an aggressor base station performs RIM-RS detection. The aggressor base station (Aggressor gNB) is split into a base station's centralized control unit (CU) and a base station's distributed unit (DU), and one CU may be connected to a plurality of DUs. The base station may be a 5G base station, or an LTE base station, or a base station of other access modes. This embodiment takes a 5G base station, a gNB, as an example, and if it is used in other systems, the corresponding interfaces and message names are also changed correspondingly. It should be noted that not all of the following steps are necessary to be performed, but all or part of the steps may be performed depending on different cases, for example, in which whether the OAM configuration is on the DU or on the CU.

Step 500: The CU of the aggressor base station transmits, to the DU, a message of reference signal measurement configuration, for indicating the DU to monitor the RIM-RS.

The DU may initiate RIM-RS detection based on the measurement configuration message received from the CU. The information related to the RIM-RS measurement configuration may be configured by the OAM to the CU, or may be transmitted to the CU of the aggressor base station by the victim base station through a backhaul signaling by using the previously set aggressor base station Set ID and the victim base station Set ID, after the victim base station detects the remote interference. The configuration information includes one or more of the following information:

a measurement method (periodically monitoring signals at specified time-frequency positions);

a reporting threshold or a reporting condition, if the RIM-RS measurement result of the DU exceeds the threshold, the DU needs to report the measurement result to the CU, or according to the reporting condition, the DU reports the RIM-RS measurement result to the CU;

a threshold for performing interference mitigation scheme, if the RIM-RS measurement result of the DU satisfies the threshold, the DU may initiate performing the interference mitigation scheme;

configuration information of interference mitigation scheme, such as one or more interference mitigation schemes below (it does not exclude the interference mitigation scheme newly incorporated into the specification as the research progresses deeper) (it may be configured by the OAM to the CU, or may be generated by the CU itself);

time-domain solutions: such as muting downlink symbols that cause interference frequency-domain solutions: such as changing transmission frequency band BWP power-domain solutions: such as reducing transmission power of downlink symbols that cause interference spatial-domain solutions: such as changing the beam parameter, down-tilt an aggressor base station Set ID (acquired by the CU through interaction with the OAM, or pre-configured by the CU).

Alternatively, the DU directly acquires the RIM-RS measurement configuration and the aggressor base station Set ID from the OAM, and initiates monitoring the RIM-RS, and thus there is no need for the CU to transmit a message to trigger the DU to perform the RIM-RS detection, that is, step 500 is not necessary to be performed.

When the DU of the victim base station detects the remote interference, configures the RIM-RS, and starts to transmit the RIM-RS at the air interface, the base station (Aggressor gNB) causing the remote interference may also receive the RIM-RS at the air interface through the atmospheric ducting phenomenon. When the DU of the aggressor base station detects the RIM-RS for the first time at the air interface, if the RIM-RS measurement result of the DU exceeds a reporting threshold (this threshold may be an absolute value of the RIM-RS power such as in unit of dBm), the DU reports to the CU information on the monitored RIM-RS, and then the CU interacts with the OAM to obtain the configured interference mitigation scheme and the allocated aggressor base station Set ID, or the CU may also decide the interference mitigation scheme by itself and utilize the pre-configured aggressor base station Set ID, and then transmit an indication message to the DU. Optionally, the DU directly reports to the OAM information on the monitored RIM-RS, and obtains the configured interference mitigation scheme and the allocated aggressor base station Set ID from the OAM. Optionally, the DU may configure the interference mitigation scheme and utilize the pre-configured aggressor base station Set ID by itself. Alternatively, the DU obtains the configuration information of the interference mitigation scheme configured by the CU and the aggressor base station Set ID at step 500.

Step 501: The DU of the aggressor base station transmits, to the CU, a message of reference signal measurement report, for reporting that the RIM-RS is detected.

When the DU of the aggressor base station detects the RIM-RS for the first time at the air interface, if the RIM-RS measurement result of the DU exceeds a reporting threshold (this threshold may be an absolute value of the RIM-RS power such as in unit of dBm), but does not satisfy the threshold for performing interference mitigation scheme, the DU needs to report to the CU, and the message 501 includes one or more of the following information:

- a victim base station Set ID (acquired by demodulating the RIM-RS) (when only the victim base station Set ID is present, it also implicitly indicates that the RIM-RS is detected);
- an indication of reception of RIM-RS (optional information, because when only the victim base station Set ID is present, it also implicitly indicates that the RIM-RS is detected);
- request for interference mitigation scheme (optional information, when the information of the RIM-RS measurement result at the DU side is carried, it may also implicitly represents a request for the interference mitigation scheme, and the CU selects the appropriate interference mitigation scheme according to the measurement result or the CU obtains the interference mitigation scheme from the OAM (if the DU is configured with an interference mitigation scheme, no further requests are required);
- information on interference mitigation scheme configured by the DU, such as one or more interference mitigation schemes below (optional information, the DU is configured with the interference mitigation scheme by the OAM or by itself):
  - time-domain solutions: such as muting downlink symbols that cause interference
  - frequency-domain solutions: such as changing transmission frequency band BWP
  - power-domain solutions: such as reducing transmission power of downlink symbols that cause interference
  - spatial-domain solutions: such as changing the beam parameter, down-tilt
- information of cell on which a RIM-RS is detected, such as cell identification information (an NR CGI, or a PCI, or an index) (optional information, the CU stores the information of the cell on which the RIM-RS is detected) (or information of the frequency on which the RIM-RS is detected); and
- measurement result of each cell on which a RIM-RS is detected (such as a RIM-RS power value, time delay, and the like).

If the DU requests an interference mitigation scheme from the CU, the CU of the aggressor base station interacts with the OAM to obtain the applied interference mitigation scheme and the configured aggressor base station Set ID, or the CU may decide the applied interference mitigation scheme by itself and utilize the pre-configured aggressor base station Set ID, and then transmit the same to the DU.

Step 502: The CU of the aggressor base station transmits, to the DU an indication message of performing an interference mitigation scheme for indicating the DU to initiate performing the interference mitigation scheme.

The CU of the aggressor base station transmits a message to the DU of the base station, and the message at step 502 indicates which interference mitigation scheme the DU starts to perform. This message includes one or more of the following:

- an aggressor base station Set ID (acquired by the CU through interaction with the OAM, or pre-configured by the CU. If the information is updated, the DU is notified);
- indication information on performing an interference mitigation scheme;
- configuration information of an interference mitigation scheme, such as one or more interference mitigation schemes below (it does not exclude the interference mitigation scheme newly incorporated into the specification as the research progresses deeper) (it may be configured by the OAM to the CU, or may be generated by the CU itself, and if the DU is not configured with the interference mitigation scheme, the DU is notified):
  - time-domain solutions: such as muting downlink symbols that cause interference
  - frequency-domain solutions: such as changing transmission frequency band BWP
  - power-domain solutions: such as reducing transmission power of downlink symbols that cause interference
  - spatial-domain solutions: such as changing the beam parameter, down-tilt
- information of cell on which an interference mitigation scheme is performed, such as cell identification information (a NR CGI, or a PCI, or an index) (optional information, if the CU has already known the information of the cell on which the RIM-RS is received at step 501, it may directly indicate the information of the cell on which the interference mitigation scheme is performed).

After the DU of the aggressor base station receives the message 502, an interference mitigation scheme starts to be performed on the cell indicated by the CU. If the CU does not indicate the information of the cell on which the interference mitigation scheme is performed by the DU, the DU may perform the interference mitigation scheme on the cell on which the RIM-RS is detected or on the cell on which the RIM-RS is not detected.

Step 503: The DU of the aggressor base station transmits, to the CU, a notification message of performing an interference mitigation scheme, for informing the CU of the information that the DU has initiated performing the interference mitigation scheme.

When the DU detects the RIM-RS, if the DU may initiate performing the interference mitigation scheme by itself, it is not necessary to request the CU again, that is, at step 500, the CU configures the configuration information of interference mitigation scheme, the threshold for performing the interference mitigation scheme and the aggressor base station Set ID. Alternatively, the DU reports information on the monitored RIM-RS to the OAM, obtains the configured interference mitigation scheme and the allocated aggressor base station Set ID from the OAM, or make a query from the OAM to obtain information on one or more tracking area identities (IDs)/global base station identities (IDs) to which the victim base station Set ID included in the RIM-RS is mapped. Alternatively, the DU may configure the interference mitigation scheme by itself and utilize the pre-configured aggressor base station Set ID. And the measurement result of the RIM-RS detected by the DU satisfies the threshold for performing the interference mitigation scheme (if the threshold is present), then the DU will immediately start to perform the interference mitigation scheme, and steps 501 and 502 may not be performed, and it directly proceeds from step 500 to step 503 to be performed. The DU may use the message at step 503 to inform the CU of the configuration information of interference mitigation scheme decided by the DU (or configured by the OAM to the DU). The message at step 503 includes one or more of the following information:

information of cell on which a RIM-RS is detected, such as cell identification information (a NR CGI, or a PCI, or an index) (optional information, the CU stores the information of the cell on which a RIM-RS is detected) (or information of the frequency on which the RIM-RS is detected);

measurement result of each cell on which the RIM-RS is detected (optional information, such as a RIM-RS power value, time delay, and the like);

a victim base station Set ID (acquired by demodulation of the RIM-RS) (when only the victim base station Set ID is present, it also implicitly indicates that the RIM-RS is detected);

an indication of reception of RIM-RS (optional information, because when only the victim base station Set ID is present, it also implicitly indicates that the RIM-RS is detected);

notification information on DU performing an interference mitigation scheme;

information on interference mitigation scheme configured by the DU, such as one or more interference mitigation schemes below (it does not exclude the interference mitigation scheme newly incorporated into the specification as the research progresses deeper) (the configuration of interference mitigation scheme may be configured by the OAM to the DU, or may be configured by the DU itself, and if the configuration information is updated, the CU is notified):

time-domain solutions: such as muting downlink symbols that cause interference frequency-domain solutions: such as changing transmission frequency band BWP power-domain solutions: such as reducing transmission power of downlink symbols that cause interference spatial-domain solutions: such as changing the beam parameter, down-tilt information of cell on which an interference mitigation scheme is performed, such as cell identification information (a NR CGI, or a PCI, or an index) (optional information, the CU stores the information of the cell on which the interference mitigation scheme is performed);

an aggressor base station Set ID (it may be configured by the OAM to the DU, or the DU may be pre-configured with the Set ID. When an alternative backhaul Solution 1 mentioned in the specification TR38.866 is used to transmit the information on detection or disappearance of the RIM-RS to the victim base station, if the information has not been notified to the CU previously by other means such as the F1 Setup procedure, or if the information is updated even though the information has been notified previously, the CU is notified of this information); and information on one or more tracking area identities (IDs)/global base station identities (IDs) (the DU interacts with the OAM and makes a query from the OAM to obtain information on one or more tracking area identities (IDs)/global base station identities (IDs) to which the victim base station Set ID is mapped, if an alternative Solution 2 mentioned in the specification TR38.866 is used to transmit the information on detection or disappearance of the RIM-RS to the victim base station through the backhaul network, the CU is notified of this information).

When one DU detects the RIM-RS, in order to expand the scope for performing the interference mitigation scheme, it may be necessary for DUs near the DU to also perform the same interference mitigation scheme, the DU informs the CU of the configuration information of the interference mitigation scheme decided by the DU (configured by the OAM to the DU), and the CU needs to forward the configuration information of the interference mitigation scheme to other DUs. Alternatively, when one DU detects the RIM-RS, in order to expand the scope for performing the interference mitigation scheme, it may be necessary for DUs near the DU to also perform the same interference mitigation scheme, and the DU informs the CU that the DU discovers the RIM-RS, the CU decides the configuration information of the interference mitigation scheme and transmits the configuration information of the interference mitigation scheme to all of corresponding DUs.

If the configuration information of the interference mitigation scheme is configured by the CU to the DU at step 502, and/or the DU initiates performing the interference mitigation scheme based on the message at step 502, this message may be a response message to step 502. In this case, the message at step 503 includes the following information:

response information on performing interference mitigation scheme (if the CU indicates performing the interference mitigation scheme to the DU, the DU informs the CU through this information when the DU succeeds or fails in performing).

Since there are multiple DUs in the same area that detect the RIM-RS and some of the DUs may be deployed under CUs of different base stations, the DUs that detect the RIM-RS, together with the CUs to which the DUs are connected, perform the above steps, and then the DUs get the same aggressor base station Set ID and the corresponding configuration information of the interference mitigation scheme, and initiate performing the interference mitigation scheme.

The DU may detect multiple RIM-RSs at the same time, which may be generated by victim base stations in different areas. Because their interference characteristics may be different (such as difference in the number of victim symbols), so the victim base stations in different areas may allocate different RIM-RS configuration information and different Set IDs to the DU by analyzing the interference measurement results, and then the DUs of the victim base stations in different areas transmit differently configured RIM-RSs at the air interfaces. In this way, the DU of the aggressor base station may detect the RIM-RS information of different Set IDs at the air interface at the same time. Then, the DU or the CU or the OAM may configure different interference mitigation schemes to the DU for the victim base stations of different Set IDs by analyzing the measurement result of the RIM-RS, and then the DU may simultaneously perform multiple interference mitigation schemes.

When the CU of the aggressor base station knows that the DU detects the RIM-RS at step 501, the aggressor base station needs to inform the victim base station that the RIM-RS has been received by the aggressor base station through backhaul signaling. The atmospheric ducting phenomenon still exists, so the victim base station needs to continue transmitting the RIM-RS for monitoring when the atmospheric ducting phenomenon disappears.

Step 504: The DU of the aggressor base station transmits, to the CU an indication message of reference signal reception, for reporting reception of the RIM-RS.

The DU at the victim base station side continues transmitting the RIM-RS. If the atmospheric ducting phenomenon still exists, the DU of the aggressor base station can still detect the RIM-RS, and then report to the CU, the CU continues indicating status information on reception of RIM- RS to the victim base station through the backhaul signaling, and the victim base station needs to continue transmitting the RIM-RS. The message 504 includes one or more of the following:

- a victim base station Set ID (acquired by demodulating the RIM-RS) (when only the victim base station Set ID is present, it also implicitly indicates that the RIM-RS is detected);
- indication information on reception of RIM-RS (optional information, because when only the victim base station Set ID is present, it also implicitly indicates that the RIM-RS is detected); and
- information of cell on which a RIM-RS is detected, such as cell identification information (a NR CGI, or a PCI, or an index) (or information of the frequency on which the RIM-RS is detected).

If the DU detects a plurality of RIM-RSs of different Set IDs at the same time, it may simultaneously report the status information on reception of the RIM-RSs of different Set IDs to the CU by using a form of list.

Step 505: The DU of the aggressor base station transmits, to the CU, an indication message of reference signal disappearance, for reporting disappearance of RIM-RS.

The DU at the victim base station side continues transmitting the RIM-RS. If the atmospheric ducting phenomenon disappears and in all the cells under the DU of the aggressor base station the RIM-RS is not detected, the DU reports the status information on disappearance of the RIM-RS to the CU.

The message 505 includes one or more of the following:
- a victim base station Set ID (optional information, if the method, in which of detection of the RIM-RS is implicitly indicated when only the victim base station Set ID is present, is used, that the disappearance of RIM-RS is implicitly indicated when there is no victim base station Set ID may be used);
- indication information on disappearance of RIM-RS (optional information, if the method, in which detection the RIM-RS is implicitly indicated when only the victim base station Set ID is present, is used, that the disappearance of RIM-RS is implicitly indicated when there is no victim base station Set ID may be used); and
- information of cell on which a RIM-RS disappears, such as cell identification information (a NR CGI, or a PCI, or an index) (or frequency information of the cell on which the RIM-RS disappears).

If the DU initially detects the RIM-RSs of different Set IDs at the same time, and now does not detect the RIM-RS of some or all of the Set IDs, it may simultaneously report the status information on disappearance of the RIM-RSs of different Set IDs to the CU by using a form of list.

There are multiple aggressor base stations in each aggressor base station Set ID, there are multiple DUs under each aggressor base station, and there are multiple cells under each DU. In the state that in all the cells under the DU the RIM-RS is not detected, the DU reports the status information on disappearance of RIM-RS to the CU. Similarly, in the state that in all the DUs under the CU the RIM-RS is not detected, the CU indicates the status information on disappearance of the RIM-RS to the victim base station by the backhaul signaling. The victim base station then stops transmitting the RIM-RS.

Step 506: The CU of the aggressor base station transmits, to the DU, an indication message of terminating an interference mitigation scheme, for indicating termination of the interference mitigation scheme to the DU.

In the state that in all the cells under the DU of the aggressor base station the RIM-RS is not detected, the DU reports the status information on disappearance of the RIM-RS to the CU, and then the CU indicates termination of the interference mitigation scheme to the DU. The message 506 includes one or more of the following information:

- indication information on termination of interference mitigation scheme (if the DU simultaneously detects multiple RIM-RSs of different Set IDs and simultaneously performs multiple interference mitigation schemes, it is necessary to indicate which Set ID the mitigation scheme corresponding to needs to be terminated, that is, carrying identification information of the interference mitigation scheme);
- identification information of interference mitigation scheme; and
- information of cell on which the interference mitigation scheme is terminated, such as cell identification information (a NR CGI, or a PCI, or an index) (optional information, if the CU has already known the information of the cell on which performance of the interference mitigation scheme is initiated, it may directly indicate the information of the cell on which the interference mitigation scheme is terminated).

Another way to be taken is that the DU knows the cells on which the interference mitigation scheme is being performed, when in all the cells the RIM-RS is not received, it shows that the atmospheric ducting phenomenon does not exist in the area covered by all the cells under the DU, and the DU may decide to terminate the interference mitigation scheme and then inform the CU.

Step 507: The DU of the aggressor base station transmits, to the CU, a response message of terminating the interference mitigation scheme, for indicating that the DU has terminated the interference mitigation scheme.

The DU obtains the indication from the CU through the message at step 506, and terminates the interference mitigation scheme. The DU may then transmit a response message to the CU to indicate a friendly process of terminating the interference mitigation scheme. The message at step 507 includes the following information:

- response message of terminating interference mitigation scheme (if the DU simultaneously detects multiple RIM-RSs of different Set IDs and simultaneously performs multiple interference mitigation schemes, it is necessary to indicate which Set ID the mitigation scheme corresponding to has been terminated, that is, carrying identification information of the interference mitigation scheme); and
- identification information of interference mitigation scheme.

In the state that in all the cells under the DU of the aggressor base station the RIM-RS is not detected, the DU reports the status information on disappearance of RIM-RS to the CU, and then the DU may decide to terminate performing the interference mitigation scheme by itself, without need for the CU to perform step 506 to indicate terminating the interference mitigation scheme to the DU, and then the DU transmit a message to inform the CU. In this case, the message at step 507 includes the following information:

- notification information on DU terminating interference mitigation scheme (if the DU simultaneously detects multiple RIM-RSs of different Set IDs and simultaneously performs multiple interference mitigation schemes, it is necessary to indicate which Set ID the mitigation scheme corresponding to has been terminated, that is, carrying identification information of the interference mitigation scheme); and identification information of interference mitigation scheme.

If, after getting the report of the DU detecting the RIM-RS, the CU indicates application of the interference mitigation scheme on the nearby DUs in which the RIM-RS is not detected, for terminating the interference mitigation scheme of these DUs, step 506 and step 507 are performed so that termination of the mitigation scheme is triggered by the CU. Because these DUs do not detect the RIM-RS, and are not able to detect when the RIM-RS disappears, the CU is required to control performing and stopping the interference mitigation scheme.

When the DU terminates performing the interference mitigation scheme and restores the original configuration, it stops monitoring the RIM-RS.

Steps 501 to 507 in FIG. 5 may be performed in the order shown in FIG. 5, or may be performed in other orders. The above steps may be performed separately, or may be performed in combination of any two or more steps.

In an embodiment, only step 504 is performed. Further, the step may be performed when the DU of the aggressor base station is connected to the OAM or the CU of the aggressor base station is connected to the OAM.

In an embodiment, only step 505 is performed. Further, the step may be performed when the DU of the aggressor base station is connected to the OAM or the CU of the aggressor base station is connected to the OAM.

In an embodiment, only notification of terminating the interference mitigation scheme at step 507 is performed. Further, this step may be performed, when the DU of the aggressor base station is connected to the OAM, or the CU of the aggressor base station is connected to the OAM.

In an embodiment, steps 506 and 507 are performed. Further, the steps may be performed when the DU of the aggressor base station is connected to the OAM, or the CU of the aggressor base station is connected to the OAM.

In an embodiment, only notification of performing the interference mitigation scheme at step 503 is performed. Further, this step may be performed when the DU of the aggressor base station is connected to the OAM.

In an embodiment, steps 501 and 502 are performed. Further, the steps may be performed when the aggressor base station is connected to the OAM, or when the CU of the aggressor base station is connected to the OAM.

In an embodiment, steps 501, 502, and 503 are performed. Further, the steps may be performed when the DU of the aggressor base station is connected to the OAM, or the CU of the aggressor base station is connected to the OAM.

Figure 6:
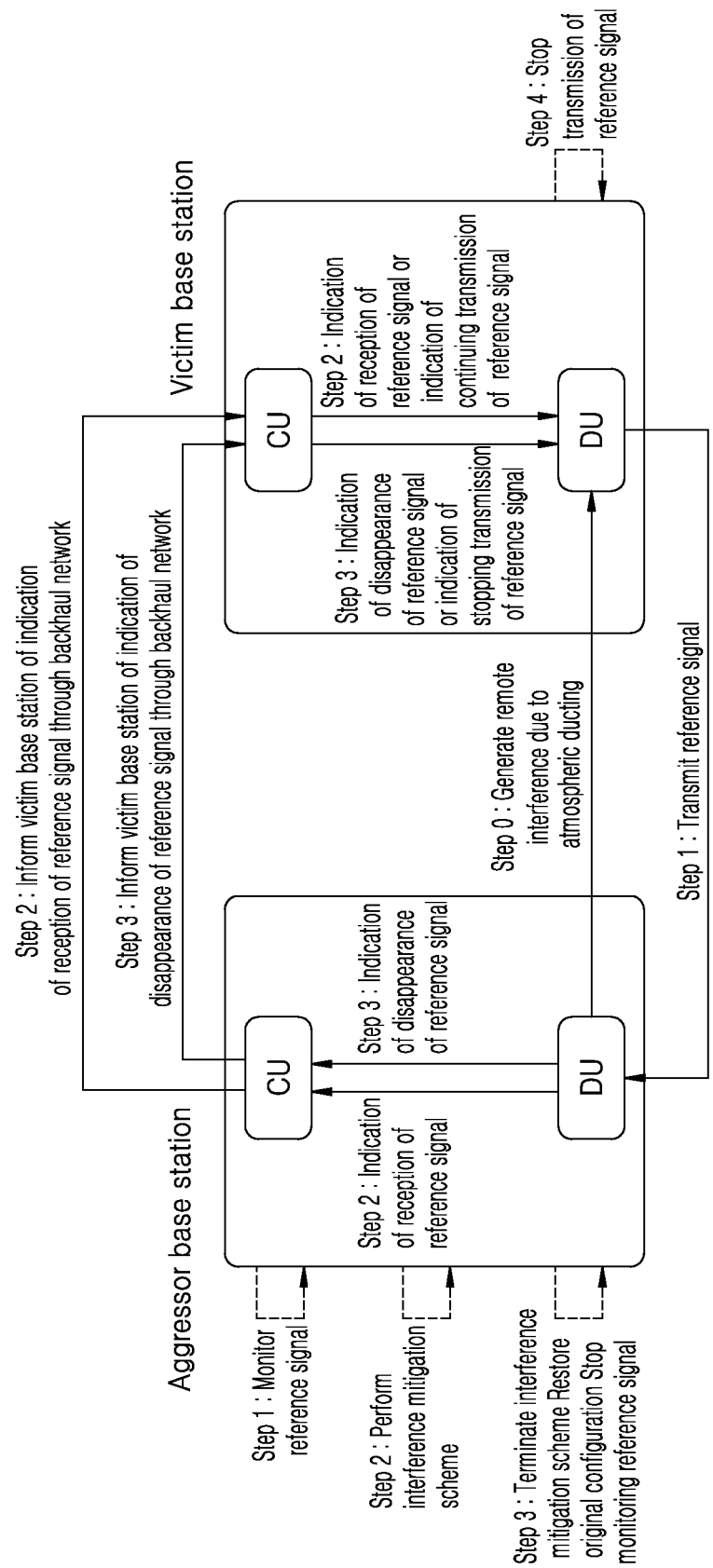
FIG. 6 illustrates a chart of workflow of an improved RIM framework 2.1 with split CU-DU according to an embodiment of the present disclosure.

FIG. 6 describes a third embodiment of the present disclosure. The prototype is based on FIG. 2, as for that the traditional base station in the figure for Framework 2.1 proposed by the RAN WG1 is split into a base station's central control unit (CU) and a base station's distributed unit (DU), it is assumed that the DU obtains the RIM-RS configuration information from the OAM, the DU obtains the interference mitigation scheme configuration from the OAM, and there is no need to exchange information such as the detection of the remote interference, the configuration of the RIM-RS, the detection of the RIM-RS, and the configuration information of the interference mitigation scheme at the F1 interface. The workflow is as follows:

Step 0: Atmospheric ducting phenomenon happens and the remote interference appears.

Step 1: The DU of a local base station detects that the surrounding interference over thermal (IoT) increases beyond a threshold upon reception on the uplink, which means that the local base station experiences the interference from the remote aggressor base station in a certain area, the local victim base station is called the victim base station, and the remote aggressor base station is called the aggressor base station. The base station may be a 5G base station, or an LTE base station, or a base station of other access modes. This embodiment takes a 5G base station, a gNB, as an example, if it is used in other systems, the corresponding interfaces and message names are also changed accordingly. Then, the DU at the victim base station side interacts with the OAM to obtain the RIM-RS configuration information, or may configure the RIM-RS by itself according to the pre-configured Set ID and initiate transmitting the RIM-RS. At the same time, the DU at the aggressor base station side directly initiates RIM-RS monitoring as configured by the OAM.

Step 2: Upon reception of the RIM reference signal (RIM-RS), the remote aggressor base station informs the local victim base station of reception of the RIM-RS through the backhaul network, and the local victim base station remains to continue transmitting the RIM-RS. The information on detection of the RIM-RS is first acquired at the DU side of the aggressor base station, but the CU of the aggressor base station is connected to the 5G core network element, and the CU is responsible for informing the victim base station of information on reception of RIM-RS through the backhaul network. At this stage, the specification for the RIM Framework 2.1 does not relate to how the base station handles this problem under the CU-DU split architecture. With the method of the aggressor base station side of the present disclosure, the central unit device of the base station receives information on reception status of the reference signal transmitted by the distributed unit device of the base station, and the information on the reception status of the reference signal includes indication information on reception of the RIM-RS. Therefore, the DU needs to signal the CU through the F1 interface, and then the CU may send back the information to the victim base station side through the backhaul network. It is assumed that the DU may interact with the OAM to obtain an interference mitigation scheme and start application of the interference mitigation scheme without informing the CU.

When the victim base station receives the status information indicating reception of the RIM-RS forwarded from the backhaul network, it will be decided that the victim base station continues transmitting the RIM-RS. However, the CU at the victim base station side is connected to the 5G core network element, and firstly acquires indication information on reception of the reference signal by the backhaul network, and the DU is responsible for transmitting the reference signal. At this stage, the specification for the RIM Framework 2.1 does not relate to how the base station handles this problem under the CU-DU split architecture. With the method of the victim base station side of the present disclosure, the distributed unit device of the base station receives information on reception status of the reference signal transmitted by the central unit device of the base station, and the information on the reception status of the reference signal includes indication information on reception of the RIM-RS. Therefore, the CU may transmit a message to the DU, for indicating to the DU the reception status of the RIM-RS, and then the DU decides to continue transmitting the RIM-RS, or the CU may directly indicates that the DU continues transmitting the RIM-RS to monitor when the atmospheric ducting phenomenon disappears. If a mechanism at the DU side is that the RIM-RS continues being transmitted until an indication of disappearance of RIM-RS or indication information on stopping transmission of RIM-RS is received, this indication message is not mandatory, because the DU has already been in the status of transmitting the RIM-RS. If there is a corresponding timer mechanism at the DU side, in which if an indication of reception of the RIM-RS or indication information on continuing transmission of the RIM-RS has been received when the timer expires, the DU will stops transmitting the RIM-RS, then the indication message is mandatory.

Step 3: Upon no reception of the RIM-RS, the remote aggressor base station informs the local victim base station of the "disappearance" of the RIM-RS through the backhaul network. Similarly, the information that the RIM-RS is not detected is first acquired at the DU side, but the CU of the aggressor base station is connected to the 5G core network element, and the CU is responsible for informing the local victim base station of information that the RIM-RS has not been received through the backhaul network. At this stage, the specification for the RIM Framework 2.1 does not relate to how the base station handles this problem under the CU-DU split architecture. With the method of the aggressor base station side of the present disclosure, the central unit device of the base station receives information on reception status of the reference signal transmitted by the distributed unit device of the base station, and the information on the reception status of the reference signal includes indication information on disappearance of the RIM-RS. Therefore, the DU needs to signal the CU through the F1 interface, and then the CU may send back the information to the victim base station side through the backhaul network. It is assumed that the DU does not monitor the RIM-RS, it directly undoes the application of the interference mitigation scheme, restores to the previous status, and immediately stops detecting the RIM-RS, and the CU is not required to be notified.

Step 4: The local victim base station stops transmitting the RIM-RS upon reception of an indication of disappearance of the RIM-RS. The CU of the victim base station side first receives the indication information of disappearance of the RIM-RS transferred through the backhaul network, and the DU is responsible for stopping transmission of the reference signal. At this stage, the specification for the RIM Framework 2.1 does not relate to how the base station handles this problem under the CU-DU split architecture. With the method of the victim base station side of the present disclosure, the distributed unit device of the base station receives information on reception status of the reference signal transmitted by the central unit device of the base station, and the information on the reception status of the reference signal includes indication information on disappearance of the RIM-RS. Therefore, the CU needs to signal the DU through the F1 interface, indicates to the DU the status of disappearance of the RIM-RS, and then the DU decides to stop transmitting the RIM-RS, or the CU directly indicates stopping transmission of the RIM-RS to the DU.

Summarizing the above process, it may be found that, for the base station with the CU-DU split, the F1 interface messages required for completing the entire RIM mechanism are as follows. The information transmitted to the DU by the CU of the victim base station side, at least one of the following information:

identification information of reference signal (if the DU transmits multiple RIM-RSs at the same time, it needs to indicate which RIM-RS continues being transmitted or stops being transmitted);
    indication information on reception of RIM-RS;☐
    indication information on continuing transmission of RIM-RS;
    information of cell or frequency on which reference signal continues being transmitted;
    indication information on disappearance of RIM-RS;☐
    indication information on stopping transmission of RIM-RS; and
    information of cell or frequency on which reference signal stops being transmitted.

The information transmitted to the CU by the DU of the aggressor base station side includes at least one of the following information:

identification information of reference signal (if the DU detects multiple RIM-RSs at the same time, it needs to indicate which RIM-RS is in the status of reception or disappearance);
    indication information on reception of RIM-RS;☐
    information of cell or frequency on which a RIM-RS is detected;
    indication information on disappearance of RIM-RS;☐
    information of cell or frequency on which a RIM-RS is not detected, i.e., cell or frequency on which a RIM-RS disappears;
    a victim base station Set ID (acquired by demodulation of the RIM-RS) (when only the victim base station Set ID is present, it also implicitly indicates that the RIM-RS is detected) (if the identification information of the reference signal includes the victim base station Set ID, it is not necessary to inform CU of this information at this time);
    an aggressor base station Set ID (it may be configured by the OAM to the DU, or the DU may be pre-configured with the Set ID. If an alternative backhaul Solution 1 mentioned in the specification TR38.866 is used to transmit the information on detection or disappearance of the RIM-RS to the victim base station, and the information has not been notified to the CU previously by other means such as the F1 Setup procedure, or if the information is updated even though the information has been notified previously, the CU is notified of this information);
    information on one or more tracking area identities (IDs)/base station global identity (ID) (the DU interacts with the OAM and makes a query from the OAM to obtain information on one or more tracking area identities (IDs)/base station global identity (ID) to which victim base station Set ID is mapped, if an alternative Solution 2 mentioned in the specification TR38.866 is used to transmit the information on detection or disappearance of the RIM-RS to the victim base station through the backhaul network, the CU is notified of this information).

Figure 7:
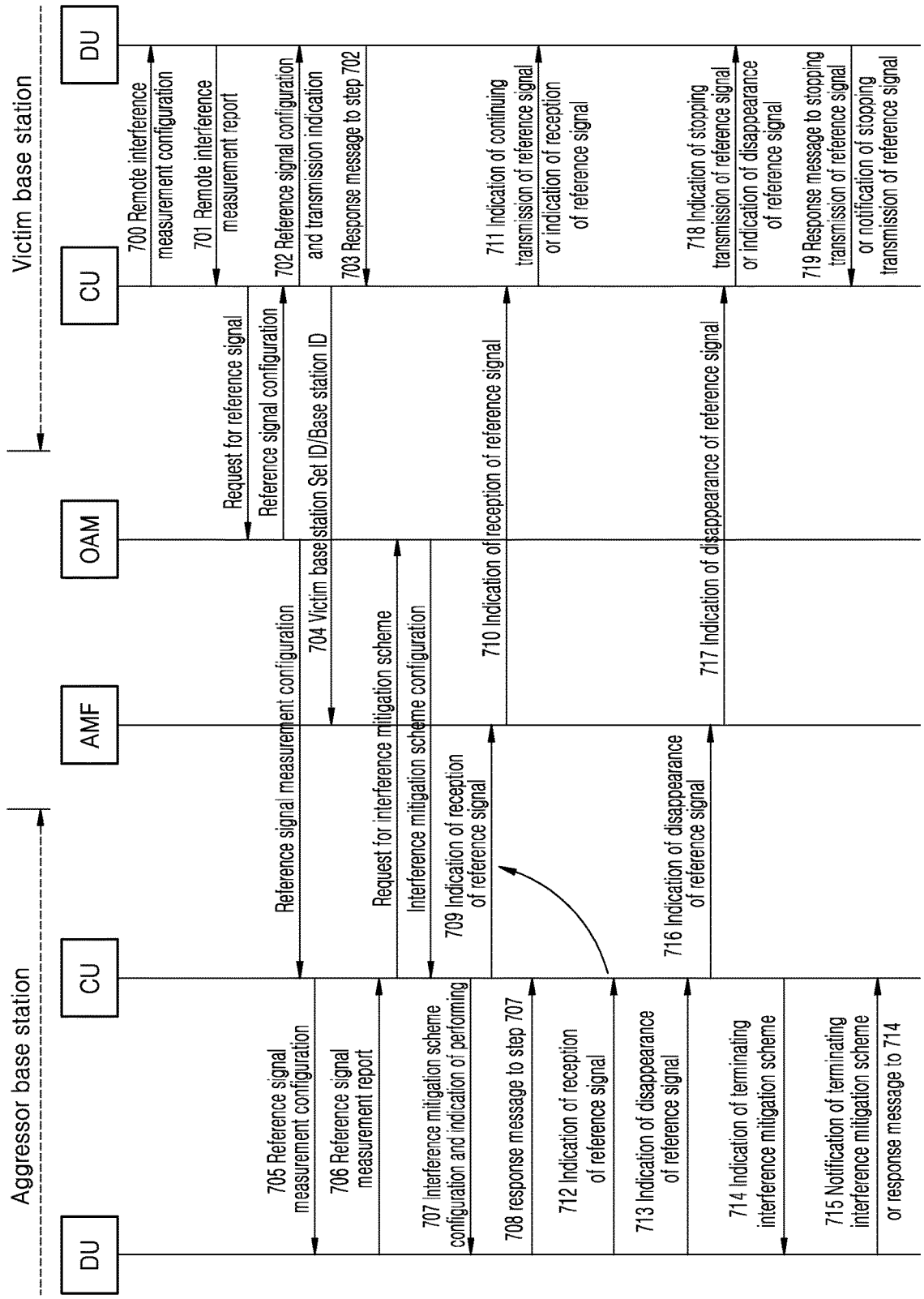
FIG. 7 illustrates an entire RIM signaling flowchart for acquiring RIM-RS configuration information through interaction between the CU and the OAM according to an embodiment of the present disclosure.

FIG. 7 describes a fourth embodiment of the present disclosure. FIG. 7 describes an entire flow triggered by a victim base station detecting remote interference. The base station is split into a base station's central control unit (CU) and a base station's distributed unit (DU), and one CU may be connected to a plurality of DUs. The base station may be a 5G base station, or an LTE base station, or a base station of other access modes. This embodiment takes a 5G base station, a gNB, as an example, if it is used in other systems, the corresponding interfaces and message names are also changed accordingly. This embodiment assumes that the CU obtains RIM-RS configuration information from the OAM, and the CU may configure an interference mitigation scheme by itself, or the CU obtains an interference mitigation scheme from the OAM and the CU transmits it to the DU. It is assumed that the aggressor base station and the victim base station are located on the same AMF. It is assumed that the victim base station only suffers from interference from an aggressor base station in one remote area, only a RIM-RS of one Set ID is transmitted at the DU side of the victim base station, and the aggressor base station generates remote interference only with the victim base stations in one area, and only a RIM-RS of one Set ID is detected at the DU side of the aggressor base station.

Step 700: The CU transmits a message to the DU, for configuring the DU to perform remote interference measurement.

The remote interference measurement configuration may be configured by the OAM to the CU, or may be generated by the CU itself. The CU then transmits a message of the remote interference measurement configuration to the DU, and the message includes one or more of the following information:
- a measurement method (such as measuring an average value of remote interference noise from which the symbols in the uplink subframes have suffered over a certain period of time); and
- a reporting threshold or a reporting condition, if the remote interference measurement result of the DU exceeds the threshold, the DU needs to report the measurement result to the CU, or according to the reporting condition, the DU reports the remote interference measurement result to the CU.

Alternatively, for detecting the remote interference, the DU may distinguish it through the interference characteristics (one or more cells of the DU monitor at the air interface that the symbols in the uplink subframe are suffering from the thermal noise interference (IoT), and exhibits a status in which as the symbols spread on time domain, the noise power gradually decreases from high to low, which shows that the noise is caused by the remote interference), thus the DU may initiate the measurement configuration by itself, and there is no need for the CU to transmit a message to trigger the DU to perform the remote interference measurement, that is, step 700 is not necessary to be performed.

The DU pre-configures a remote interference threshold. If the remote interference exceeds the set threshold (this threshold may be an absolute value of the remote interference such as in unit of dBm, or a relative value such as the minimum signal-to-noise ratio (SNR) required for uplink demodulation), the DU will trigger the remote interference mitigation mechanism. Alternatively, the DU receives the configuration from the CU, and performs the remote interference measurement according to the configuration information from the CU, that is, the DU receives the message at step 700, and performs the remote interference measurement according to information carried in the message.

Step 701: The DU of the victim base station transmits a message to the CU of the base station, for reporting that the remote interference is detected.

When the DU detects the remote interference, the DU transmits the message 701 to the CU for reporting the situation of the remote interference, and the message 701 carries one or more of the following information:
- information of cell on which remote interference is detected such as cell identification information (an NR CGI, or a PCI, or an index) (optional information, the CU stores the information of the cell on which the remote interference is detected); and
- interference measurement result of each victim cell (such as an interference noise power value, a number of victim symbols, a signal-to-noise ratio upon demodulating victim symbols, and the like).

The information carried by the message 701 may only carry identification information of the DU that detects the remote interference, i.e., a base station DU ID, or also carry information of cell on which the remote interference is detected. If only the identification information of the DU is carried, the DU side has the information of the cell on which the remote interference is detected, so that after the CU subsequently interacts with the OAM to obtain the RIM-RS configuration information, it indicates starting transmission of the RIM-RS to the victim DU, or it may indicates starting transmission of the RIM-RS to the DU that does not detect the remote interference. After the DU obtains the indication, it decides to transmit the RIM-RS on the victim cell, or on all cells under the DU. If the DU reports the information of the cell on which the remote interference is detected to the CU, the CU may directly indicate on which cells in which DU the RIM-RS is to be transmitted, after acquiring the RIM-RS configuration. This embodiment assumes that the CU side has information on the victim cell, and the CU may directly indicate on which cells the DU transmits the RIM-RS.

The CU reports the remote interference detection information to the OAM and requests for obtaining the RIM-RS configuration. The RIM-RS configuration information includes a victim base station Set ID, and time-frequency resource information for transmitting the RIM-RS.

Step 702: The CU of the victim base station transmits a message to the DU of the base station, for indicating initiation of transmitting the RIM-RS to the DU.

After receiving the RIM-RS configuration information, the CU of the victim base station transmits a message to the DU of the victim base station, and the message includes the RIM-RS configuration information, or may also include information on DU and cell for transmitting the RIM-RS. The message 702 carries one or more of the following information:
- a victim base station Set ID (configured by the OAM to the CU);
- RIM-RS configuration information (configured by the OAM to the CU);
- indication information on initiation of transmitting a RIM-RS; and
- information of cell on which transmission of the RIM-RS is initiated, such as cell identification information (a NR CGI, or a PCI, or an index) (optional information, if the CU has known the information of the cell on which the remote interference is detected at step 701, the CU may directly indicate the information of the cell on which the RIM-RS is transmitted).

When one DU discovers the remote interference, in order to improve the signal energy of transmitting the RIM-RS, it may be necessary for DUs near the DU to also transmit the same RIM-RS signal, so the DU informs the CU that the DU discovers the remote interference, the CU decides the RIM-RS configuration information (or the RIM-RS configuration information is configured by the OAM to the CU), and transmits the RIM-RS configuration information to all of corresponding DUs.

After the DU obtains the indication from the CU, it transmits the RIM-RS by using the configured time-frequency resource on the cell specified by the CU or on the cell on which the remote interference is detected, which is decided by the DU, if the CU does not specify the cell, or on all the cells under the DU. The DU may then transmit response information on initiating transmission of the RIM-RS to the CU.

Step 703: The DU of the victim base station transmits a message to the CU. The message carries the following information:

response information on initiating transmission of a RIM-RS (if the CU indicates transmission of the RIM-RS to the DU, the DU informs the CU through this information when the DU succeeds or fails in performing).

Since there are multiple DUs in the same area that detect the remote interference and some of the DUs may be deployed under CUs of different base stations, the DUs that detect the remote interference, together with the CUs to which the DUs are connected, perform the above steps, and then the DUs get the same victim base station Set ID and the same time-frequency resource indication for transmitting the RIM-RS, and initiate transmission of the RIM-RS.

When the CU of the victim base station obtains information on the configured victim base station set identification (victim base station Set ID) from the OAM, it may be necessary to transmit the information on the victim base station Set ID to a core network node AMF connected to the CU.

After the CU of the aggressor base station acquires the victim base station Set ID from the RIM-RS received by the DU, status information on reception of the RIM-RS is required to inform the victim base station through the backhaul path. First, the CU of the victim base station transmits the status information on reception of the RIM-RS and the information on the victim base station Set ID to the AMF, the AMF needs to know which base stations are in the victim base station Set ID, so the AMF needs to acquire the base station identification (i.e., base station ID) included in the victim base station Set ID by using step 704.

Step 704: The CU of the victim base station transmits a message to the AMF.

The CU reports information on the configured victim base station Set ID to the AMF through the Ng interface, and the message 704 includes one or more of the following information:

a victim base station Set ID;
a base station ID.

Step 705: The CU of the aggressor base station transmits a message to the DU, for indicating monitoring the RIM-RS.

The DU may initiate detection of the RIM-RS based on the measurement configuration message received from the CU. The information related to the RIM-RS measurement configuration may be configured by the OAM to the CU, or may be transmitted to the CU of the aggressor base station by using the previously set aggressor base station Set ID and the victim base station Set ID through the backhaul signaling, after the victim base station detects the remote interference. The configuration information includes one or more of the following information:

a measurement method (periodically monitoring signals at specified time-frequency locations); and
a reporting threshold or a reporting condition, if the RIM-RS measurement result of the DU exceeds the threshold, the DU needs to report the measurement result to the CU, or according to the reporting condition, the DU reports the RIM-RS measurement result to the CU.

Step 706: The DU of the aggressor base station transmits a message to the CU, for reporting that the RIM-RS is detected.

At step 702, the DU of the victim base station starts transmission of the RIM-RS at the air interface after receiving the indication of transmitting the RIM-RS. Similarly, through the atmospheric ducting phenomenon, the base station (Aggressor gNB) causing remote interference may also receive the RIM-RS at the air interface. When the DU of the aggressor base station detects the RIM-RS for the first time at the air interface, the DU reports a message that the RIM-RS is monitored to the CU, and the message 706 includes one or more of the following information:

a victim base station Set ID (acquired by demodulation of the RIM-RS) (when only Victim base station Set ID is present, it also implicitly indicates that the RIM-RS is detected);
an indication of reception of RIM-RS (optional information, because when only Victim base station Set ID is present, it also implicitly indicates that the RIM-RS is detected);
request for interference mitigation scheme (optional information, when the measurement result information of the RIM-RS at the DU side is carried, the CU selects the appropriate interference mitigation scheme according to the measurement result or the CU obtains the interference mitigation scheme from the OAM);
information of cell on which a RIM-RS is detected, such as cell identification information (an NR CGI, or a PCI, or an index) (optional information, the CU stores the information of the cell on which the RIM-RS is detected) (or information of frequency on which the RIM-RS is detected); and
measurement result of each cell on which the RIM-RS is detected (such as a RIM-RS power value, time delay, and the like).

The information carried by the message 706 may only carry identification information of the DU that detects the RIM-RS, i.e., a base station DU ID, or also carry cell on which the RIM-RS is detected. If only the identification information of the DU is carried, the DU side has the information of the cell on which the RIM-RS is detected, so that after the CU subsequently interacts with the OAM to obtain the interference mitigation scheme, it indicates start of performing interference mitigation scheme to the DU which detects the RIM-RS, or it may indicates start of performing interference mitigation scheme to the DU which does not detect the RIM-RS. After the DU obtains the indication, it decides to perform the interference mitigation scheme on the cell on which the RIM-RS is detected, or on all cells under the DU. If the DU reports the information of the cell on which the RIM-RS is detected to the CU, and thus the CU may directly indicate on which cells in which DU the interference mitigation scheme is to be performed when acquiring the interference mitigation scheme. This embodiment assumes that the CU side has the information of the cell on which the RIM-RS is detected, and the CU may directly indicate on which cells the DU will perform the interference mitigation scheme.

The CU of the aggressor base station then interacts with the OAM to obtain the applied interference mitigation scheme and the configured aggressor base station Set ID. Alternatively, the CU may decide the applied interference mitigation scheme and utilize the pre-configured aggressor base station Set ID by itself.

Step 707: The CU of the aggressor base station transmits a message to the DU, for indicating performance of the interference mitigation scheme to the DU.

The CU of the aggressor base station transmits a message to the DU of the base station, and the message at step 707 indicates which interference mitigation scheme the DU starts to perform. This message includes one or more of the following:

an aggressor base station Set ID (it may be configured by the OAM to the CU or may be pre-configured by CU);
indication information on performing interference mitigation scheme;
configuration information on interference mitigation scheme, such as one or more interference mitigation schemes below (it does not exclude the interference mitigation scheme newly incorporated into the specification as the research progresses deeper) (it may be configured by the OAM to the CU, or may be configured by the CU according to the RIM-RS measurement result):
  time-domain solutions: such as muting downlink symbols that cause interference
  frequency-domain solutions: such as changing transmission frequency band BWP
  power-domain solutions: such as reducing transmission power of downlink symbols that cause interference
  spatial-domain solutions: such as changing the beam parameter, down-tilt
information of cell on which interference mitigation scheme is performed, such as cell identification information (a NR CGI, or a PCI, or an index) (optional information, if the CU has already known the information of the cell on which the RIM-RS is received at step 706, it may directly indicate the information of the cell on which the interference mitigation scheme is performed).

When one DU detects the RIM-RS, in order to expand the scope of performing the interference mitigation scheme, it may be necessary for DUs near the DU to also perform the same interference mitigation scheme, so the DU informs the CU that the DU discovers the RIM-RS, and the CU decides the configuration information of the interference mitigation scheme and transmits the configuration information of the interference mitigation scheme to all corresponding DUs.

After receiving the configuration information of the interference mitigation scheme, the DU of the aggressor base station starts to perform the interference mitigation scheme on the cell indicated by the CU. If the CU does not indicate the information of the cell on which the DU performs the interference mitigation scheme, the DU may perform the interference mitigation scheme on the cell on which the RIM-RS is detected or on all the cells under the DU. The DU may then transmit response information on performing the interference mitigation scheme to the CU.

Step 708: The DU of the aggressor base station transmits a message to the CU. The message carries the following information:
  response information on performing interference mitigation scheme.

Since there are multiple DUs in the same area that detect the RIM-RS and some of the DUs may be deployed under CUs of different base stations, the DUs that detect the RIM-RS, together with the CUs to which the DUs are connected, perform the above steps, and then the DUs get the same aggressor base station Set ID and the corresponding configuration information of the interference mitigation scheme, and initiate performance of the interference mitigation scheme.

Step 709: The CU of the aggressor base station transmits a message to the AMF.

When the CU knows from the DU that the DU detects the RIM-RS, which shows that the atmospheric ducting phenomenon exists between the aggressor base station and the victim base station, the aggressor base station needs to inform the victim base station that the aggressor base station has received the RIM-RS through backhaul signaling, and the atmospheric ducting phenomenon still exists, so the victim base station needs to continue transmitting the RIM-RS so that the aggressor base station continues monitoring when the atmospheric ducting phenomenon disappears. If the aggressor base station does not receive the RIM-RS, it proves that the atmospheric ducting phenomenon has disappeared. The message at step 709 includes one or more of the following information:
  an aggressor base station Set ID;
  a victim base station Set ID; and
  indication information on reception of RIM-RS.

Since there are multiple aggressor base stations in each aggressor base station Set ID, there are multiple DUs under each aggressor base station, and each DU transmits a message to the CU upon detecting the RIM-RS, if the CU initiates step 709 to transmit the message to the AMF whenever the CU receives the report that the DU detects the RIM-RS, the signaling load at the Ng interface will be increased. Therefore, the CU of the aggressor base station only transmits one piece of message to the AMF to report that the base station has detected the RIM-RS.

Step 710: The AMF forwards the message to the CU of the victim base station.

When the AMF receives a request from the aggressor base station, it forwards the status information on reception of RIM-RS to the base stations included in the destination victim base station Set ID. The AMF has already known the base station information included in the victim base station Set ID previously at step 704, so it forwards the message to the CU of the victim base station. The message 710 includes one or more of the following information:
  an aggressor base station Set ID;
  a victim base station Set ID; and
  indication information on reception of RIM-RS.

Step 711: The CU of the victim base station transmits a message to the DU, for indicating that the RIM-RS continues being transmitted.

When the CU of the victim base station receives status information indicating reception of the RIM-RS forwarded from the AMF, the CU may transmit a message to the DU to indicate the status of reception of the RIM-RS to the DU, and then the DU decides to continue transmitting the RIM-RS, or the CU directly indicates continuing transmission of the RIM-RS to the DU, so as to monitor when the atmospheric ducting phenomenon disappears. If a mechanism at the DU side is that the RIM-RS continues being transmitted until an indication of disappearance of RIM-RS or indication information on stopping transmission of RIM-RS is received, this indication message is not mandatory, because the DU has already been in the status of transmitting the RIM-RS. If there is a corresponding timer mechanism at the DU side, in which if an indication of reception of RIM-RS or indication information on continuing transmission of RIM-RS has not been received when the timer expires, the DU will stop transmitting the RIM-RS, then the indication message is mandatory. The message includes the first information or the second and third information as follows:
  indication information on reception of RIM-RS;
  indication information on continuing transmission of RIM-RS; and
  information of cell on which the RIM-RS continues being transmitted, such as cell identification information (a NR CGI, or a PCI, or an index) (optional information, if the CU has already known the information of the cell on which transmission of the RIM-RS is initiated, the CU may directly indicate the information of the cell on which the RIM-RS continues being transmitted).

After the DU obtains the status information on reception of the RIM-RS from the CU, the DU knows on which cells the RIM-RS is being transmitting, and the DU may decide that the RIM-RS continues being transmitted on these cells.

Step 712: The DU of the aggressor base station transmits a message to the CU, for reporting reception of RIM-RS.

The DU at the victim base station side continues transmitting the RIM-RS. If the atmospheric ducting phenomenon still exists, the DU of the aggressor base station may still detect the RIM-RS, and then report to the CU, steps 709 and 710 continue to be performed to indicate status information on reception of the RIM-RS to the CU of the victim base station through the backhaul signaling, and the DU of the victim base station is indicated to continue transmitting the RIM-RS through an optional step 711. The message 712 includes one or more of the following information:

a victim base station Set ID (acquired by demodulation of the RIM-RS) (when only the victim base station Set ID is present, it also implicitly indicates that the RIM-RS is detected); and indication information on reception of RIM-RS (optional information, because when only the victim base station Set ID is present, it also implicitly indicates that the RIM-RS is detected).

Step 713: The DU of the aggressor base station transmits a message to the CU, for reporting disappearance of RIM-RS.

The DU at the victim base station side continues transmitting the RIM-RS. If the atmospheric ducting phenomenon disappears and in all the cells under the DU of the aggressor base station the status of RIM-RS is not detected, the DU reports the status information on disappearance of the RIM-RS to the CU. The message 713 includes one or more of the following information:

a victim base station Set ID (optional information, if the method, in which detection of the RIM-RS is implicitly indicated when only the victim base station Set ID is present, is used, it also can be used that when there is no victim base station Set ID, disappearance of the RIM-RS is implicitly indicated); and indication information on disappearance of RIM-RS (optional information, if the method, in which detection of the RIM-RS is implicitly indicated when only the victim base station Set ID is present, is used, it also can be used that when there is no victim base station Set ID, disappearance of the RIM-RS is implicitly indicated).

Since there are multiple aggressor base stations in each aggressor base station Set ID, there are multiple DUs under each aggressor base station, and there are multiple cells under each DU, when in all the cells under the DU the status of the RIM-RS is not detected, the DU reports the status information on disappearance of the RIM-RS to the CU. Similarly, when all the DUs in the CU do not detect the status of the RIM-RS, the CU triggers step 716 to report the status information on disappearance of the RIM-RS to the AMF.

Step 714: The CU of the aggressor base station transmits a message to the DU, for indicating termination of the interference mitigation scheme.

When in all the cells under the DU of the aggressor base station the status of the RIM-RS is not detected, the DU reports the status information on disappearance of the RIM-RS to the CU, and then the CU indicates termination of the interference mitigation scheme to the DU. The message 714 includes one or more of the following information:

indication information on terminating interference mitigation scheme; and information of cell on which interference mitigation scheme is terminated, such as cell identification information (a NR CGI, or a PCI, or an index) (optional information, if the CU has already known the information of the cell on which performance of the interference mitigation scheme is initiated, it may directly indicate the information of the cell on which the interference mitigation scheme is terminated).

Another way to be taken is that the DU knows cells on which the interference mitigation scheme is being performed, and when in all the cells the RIM-RS is not received, it indicates that the atmospheric ducting phenomenon does not exist in the area covered by all the cells under the DU, so the DU may decide to terminate the interference mitigation scheme and stop monitoring the RIM-RS, and then transmit an indication message of terminating the interference mitigation scheme to inform the CU.

Step 715: The DU of the aggressor base station transmits a response message to the CU, for indicating that the DU has terminated the interference mitigation scheme.

The DU obtains the indication from the CU through the message at step 714, and terminates the interference mitigation scheme. The DU may then transmit a response message to the CU to indicate a friendly process of terminating the interference mitigation scheme. The message at step 715 includes the following information:

response information on terminating interference mitigation scheme.

When in all the cells under the DU of the aggressor base station the status of the RIM-RS is not detected, the DU reports the status information on disappearance of the RIM-RS to the CU through step 713, and then the DU may decide to terminate performing the interference mitigation scheme by itself, without need for the CU to perform step 714 to indicate terminating the interference mitigation scheme to the DU, and then the DU transmit a message to inform the CU. In this case, the message at step 715 includes the following information:

notification information on DU terminating interference mitigation scheme.

If, after the CU gets the report that the DU detects the RIM-RS, the CU indicates application of the interference mitigation scheme to the nearby DUs in which the RIM-RS is not detected, for stopping the interference mitigation scheme of these DUs, step 714 and step 715 is performed so that stopping the mitigation scheme is triggered by the CU. Because these DUs do not detect the RIM-RS, and are not able to detect when the RIM-RS disappears, the CU is required to control performing and stopping the interference mitigation scheme.

When the DU terminates performing the interference mitigation scheme and restores the original configuration, it stops monitoring the RIM-RS.

Step 716: The CU of the aggressor base station transmits a message to the AMF.

When the CU of the aggressor base station knows that all the DUs do not detect the status of the RIM-RS, it needs to inform the victim base station of the status of disappearance of RIM-RS by using the backhaul signaling. The victim base station uses it to judge whether the transmitted RIM-RS is received at the aggressor base station side. If it is not received, it indicates that the atmospheric ducting phenomenon disappears, and transmission of the RIM-RS needs to be stopped. The message 716 includes one or more of the following:

an aggressor base station Set ID;
a victim base station Set ID; and
indication information on disappearance of RIM-RS.

Since there are multiple aggressor base stations under each AMF, there are multiple DUs under each aggressor base station. When all the DUs under one CU do not detect the RIM-RS, the CU will report the indication of disappearance of the RIM-RS to the AMF. Similarity, when all the aggressor base stations under the AMF do not detect the RIM-RS, step 717 is triggered, at which the AMF forwards the indication information on disappearance of the RIM-RS to the victim base station.

Step 717: The AMF forwards a message to the CU of the victim base station.

When all the aggressor base stations under the AMF do not detect the RIM-RS, the AMF forwards the indication information on disappearance of RIM-RS to the victim base station. The AMF has already known the base station information included in the victim base station Set ID previously through step 704, so it forwards the message to the CU of the victim base station. The message 717 includes one or more of the following information
an aggressor base station Set ID;
a victim base station Set ID; and
indication information on disappearance of RIM-RS.

Step 718: The CU of the victim base station transmits a message to the DU, for indicating stopping transmission of the RIM-RS.

When the CU of the victim base station receives status information indicating disappearance of the RIM-RS forwarded from the AMF, which indicates that the atmospheric ducting phenomenon disappears, the CU needs to transmit a message of disappearance of the RIM-RS to the DU, or directly indicates stopping transmission of the RIM-RS to the DU. The message includes the first message or the second and third messages as follows:
indication information on disappearance of RIM-RS;
indication information on stopping transmission of RIM-RS; and
information of cell on which transmission of the RIM-RS is stopped such as cell identification information (a NR CGI, or a PCI, or an index) (optional information, if the CU has already known the information of the cell on which transmission of the RIM-RS is initiated, the CU may directly indicate the information of the cell on which transmission of the RIM-RS is stopped).

After the DU obtains the status information on disappearance of the RIM-RS from the CU, the DU knows cells on which the RIM-RS is being transmitted, and the DU may decide to stop transmitting the RIM-RS, and then may transmit a response message to inform the CU.

Step 719: The DU of the victim base station transmits a response message to the CU, for indicating that the DU has stopped transmitting the RIM-RS.

If the message at step 718 carries the indication information on disappearance of the RIM-RS to the DU, after the DU stops transmitting the RIM-RS, it may transmit notification information on stopping transmission of the RIM-RS to the CU. The message at step 719 includes one or more of the following information:
notification information on DU stopping transmission of RIM-RS.

If the message at step 718 carries the indication information on stopping transmission of the RIM-RS to the DU, after stopping transmitting the RIM-RS, the DU may transmit a response message to the CU to indicate a friendly process of termination of stopping transmission of the RIM-RS. The message at step 719 includes the following information:
response information on stopping transmission of RIM-RS.

Figure 8:
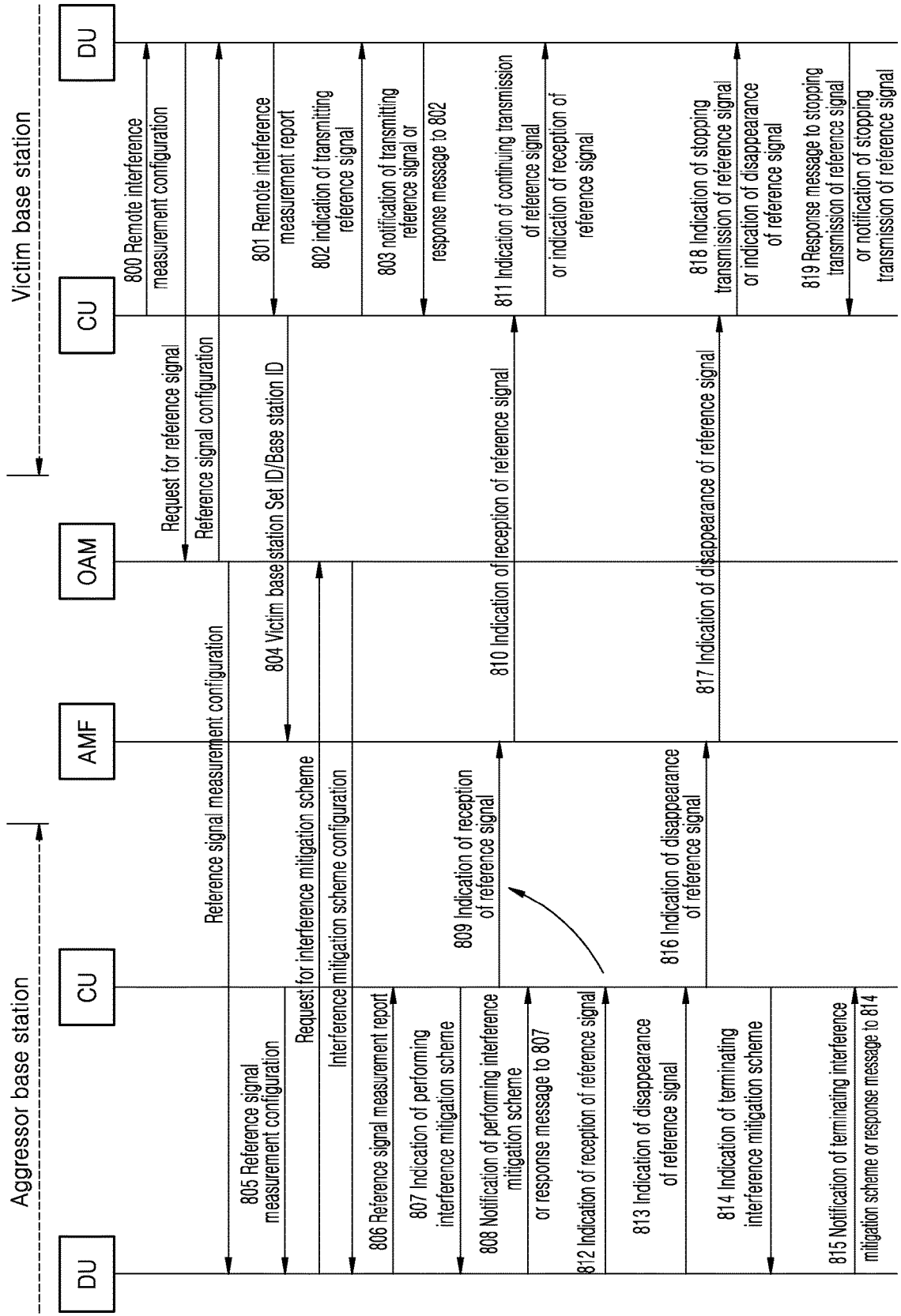
FIG. 8 illustrates an entire RIM signaling flowchart of for acquiring RIM-RS configuration information through interaction between the DU and the OAM according to an embodiment of the present disclosure.

FIG. 8 describes a fifth embodiment of the present disclosure. FIG. 8 describes an entire flow triggered by a victim base station detecting a remote interference. The base station is split into a base station's central control unit (CU) and a base station's distributed unit (DU), and one CU may be connected to a plurality of DUs. The base station may be a 5G base station, or an LTE base station, or a base station of other access modes. This embodiment takes a 5G base station, a gNB, as an example, if it is used in other systems, the corresponding interfaces and message names are also changed accordingly. This embodiment assumes that the DU obtains the RIM-RS configuration information from the OAM, and the DU may decide to configure the interference mitigation mechanism by itself or obtain the interference mitigation scheme from the OAM. It is assumed that the aggressor base station and the victim base station are located on the same AMF. It is assumed that the victim base station only suffers from an interference from an aggressor base station in one remote area, only a RIM-RS of one Set ID is transmitted at the DU side of the victim base station, and the aggressor base station generates the remote interference only with the victim base stations in one area, and only a RIM-RS of one Set ID is detected at the DU side of the aggressor base station.

Step 800: The CU transmits a message to the DU, for configuring the DU to perform remote interference measurement.

The remote interference measurement configuration may be configured by the OAM to the CU, or may be generated by the CU itself. The CU then transmits a message of remote interference measurement configuration to the DU, and the message includes one or more of the following information:
a measurement method (such as measuring an average value of remote interference noise from which the symbols in the uplink subframes have suffered over a certain period of time);
a reporting threshold or a reporting condition, if the remote interference measurement result of the DU exceeds the threshold, the DU needs to report the measurement result to the CU, or according to the reporting condition, the DU reports the remote interference measurement result to the CU; and
a threshold for transmitting a RIM-RS, if the measurement result of the DU satisfies the threshold, the DU may initiate transmission of the RIM-RS.

Alternatively, for detecting the remote interference, the DU may distinguish it through the interference characteristics (one or more cells of the DU monitor at the air interface that the symbols in the uplink subframe is suffering from the thermal noise interference (IoT), and exhibits a status in which as the symbols spread on time domain, the noise power gradually decreases from high to low, which shows that the noise is caused by the remote interference), thus the DU may initiate the measurement configuration by itself, and there is no need for the CU to transmit a message to trigger the DU to perform the remote interference measurement, that is, step 800 is not necessary to be performed.

The DU pre-configures a remote interference threshold. If the remote interference exceeds the set threshold (this threshold may be an absolute value of the remote interference such as in unit of dBm, or a relative value such as the minimum signal-to-noise ratio (SNR) required for uplink demodulation), the DU will trigger the remote interference mitigation mechanism. Alternatively, the DU receives the configuration from the CU, and performs the remote interference measurement according to the configuration information from the CU, that is, the DU receives the message at step 800, and performs remote interference measurement according to information carried in the message. After detecting the remote interference, the DU reports the remote interference detection information to the OAM and requests for the RIM-RS configuration. The RIM-RS configuration information includes a victim base station Set ID, and time-frequency resource information for transmitting the RIM-RS.

Step 801: The DU of the victim base station transmits a message to the CU of the base station, for reporting that the remote interference is detected.

When the DU detects the remote interference and obtains the configuration of the RIM-RS, if the remote interference detected by the DU is greater than the reporting threshold and is less than the threshold for transmitting a RIM-RS, the DU may transmit a message to the CU for reporting the remote interference situation, wait for that the CU indicates transmission of the RIM-RS to the DU. The message carries one or more of the following information:

- information of cell on which remote interference is detected, such as cell identification information (an NR CGI, or a PCI, or an index) (optional information, the CU stores the information of the cell on which the remote interference is detected);
- interference measurement result of each victim cell (such as an interference noise power value, a number of victim symbols, a signal-to-noise ratio upon demodulating victim symbols, and the like);
- RIM-RS configuration information (configured by the OAM to the DU); and
- a victim base station Set ID (configured by the OAM to the DU).

Step 802: The CU of the victim base station transmits a message to the DU, for indicating initiation of transmitting the RIM-RS to the DU.

The DU of the victim base station reports to the CU that the remote interference is detected, and the CU transmits a message to the DU of the victim base station to indicate starting transmission of the RIM-RS to the DU, and the message 802 carries one or more of the following information:

- indication information for initiating transmission of RIM-RS; and
- information of cell on which transmission of RIM-RS is initiated, such as cell identification information (an NR CGI, or a PCI, or an index) (optional information, if the CU has known the information of the cell on which the remote interference is detected at step 801, the CU may directly indicate the information of the cell on which the RIM-RS is transmitted).

After the DU obtains the indication from the CU, the RIM-RS is transmitted on the cell specified by the CU by using the configured time-frequency resource. Alternatively, if the CU does not specify the information of the cell on which the RIM-RS is transmitted, the DU decides to transmit the RIM-RS on the cell on which the remote interference is detected or the cell on which the remote interference is not detected, by using the configured time-frequency resource.

Step 803: The DU of the victim base station transmits a message to the CU of the base station, for indicating that the DU has started transmitting the RIM-RS.

If the DU may decide to start transmitting the RIM-RS by itself, that is, the CU configures the threshold for transmitting the RIM-RS at step 800, or the OAM configures the threshold for DU transmitting the RIM-RS and the RIM-RS configuration information, and the remote interference result detected by the DU satisfies the threshold for transmitting the RIM-RS (if there is a threshold, it needs to be met, but it may be unnecessary to set the threshold), the DU decides to start transmission of the RIM-RS, so steps 801 and 802 may not be performed. It directly proceeds from step 800 to step 803 to be performed. The DU may use the message at step 803 to inform the CU of the RIM-RS configuration information decided by the DU (which is configured by the OAM to the DU). The message at step 803 carries one or more of the following information:

- information of cell on which remote interference is detected, such as cell identification information (an NR CGI, or a PCI, or an index) (optional information, the CU stores the information of the cell on which the remote interference is detected);
- interference measurement result per victim cell (optional information, such as an interference noise power value, a number of victim symbols, a signal-to-noise ratio upon demodulation of victim symbols, and the like);
- notification information on DU initiating transmission of RIM-RS;
- information of cell on which transmission of the RIM-RS is initiated, such as cell identification information (an NR CGI, or a PCI, or an index) (optional information, the CU stores the information of the cell on which the RIM-RS is transmitted);
- RIM-RS configuration information (configured by the OAM to the DU); and
- a victim base station Set ID (configured by the OAM to the DU).

When one DU discovers the remote interference, in order to improve the signal energy of transmitting the RIM-RS, it may be necessary for DUs near the DU to also transmit the same RIM-RS signal, so the DU informs the CU of the RIM-RS configuration information decided by the DU (configured by the OAM to the DU), and the CU needs to forward the RIM-RS configuration information to other DUs.

If the DU initiates transmission of the RIM-RS based on the message at step 802, this piece of message may be a response message to step 802. In this case, the message at step 803 includes one or more of the following information:

- response information on initiating transmission of RIM-RS (if the CU indicates transmission of the RIM-RS to the DU, the DU informs the CU through this information when the DU succeeds or fails in performing).

If the DU obtain the indication of transmitting the RIM-RS from the CU at step 802, or if the DU may decide to transmit the RIM-RS by itself at step 803, the DU transmits the RIM-RS by using the configured time-frequency resources on the cell on which the remote interference is detected or on all the cells under the DU. Since there are multiple DUs in the same area that detect the remote interference and some of the DUs may be deployed under CUs of different base stations, so the DUs that detect the remote interference, together with the CUs to which the DUs are connected, perform the above steps, and then the DUs get the same victim base station Set ID and the same time-frequency resource indication for transmitting the RIM-RS, and initiate transmitting the RIM-RS.

When the CU of the victim base station obtains the configured victim base station Set ID information from the DU, it may be necessary to transmit the victim base station Set ID information to a core network node AMF connected to the CU.

After the CU of the aggressor base station acquires the victim base station Set ID from the RIM-RS received by the DU, it needs to inform the victim base station of status information on reception of the RIM-RS through the backhaul path. First, the CU of the victim base station transmits the information on the status of reception of RIM-RS and the victim base station Set ID information to the AMF, the AMF needs to know which base stations are in the victim base station Set ID, so the AMF needs to acquire the base station identification (base station ID) included in the victim base station Set ID by using step 804.

Step 804: The CU of the victim base station transmits a message to the AMF.

The CU reports the configured victim base station Set ID information to the AMF through the Ng interface, and the message 804 includes one or more of the following information:
- a victim base station Set ID; and
- a base station ID.

Step 805: The CU of the aggressor base station transmits a message to the DU, for indicating monitoring the RIM-RS.

The DU may initiate detection of the RIM-RS based on the measurement configuration message received from the CU. The information related to the RIM-RS measurement configuration may be configured by the OAM to the CU, or may be transmitted to the CU of the aggressor base station by using the previously set aggressor base station Set ID and the victim base station Set ID through the backhaul signaling after the victim base station detects the remote interference. The configuration information includes one or more of the following information:
- a measurement method (periodically monitoring signals at specified time-frequency locations);
- a reporting threshold or a reporting condition, if the RIM-RS measurement result of the DU exceeds the threshold, the DU needs to report the measurement result to the CU, or according to the reporting condition, the DU reports the RIM-RS measurement result to the CU; and
- a threshold for performing interference mitigation scheme, if the RIM-RS measurement result of the DU satisfies the threshold, the DU may initiate performing the interference mitigation scheme.

Alternatively, the DU directly acquires the RIM-RS measurement configuration from the OAM, and initiates monitoring the RIM-RS, and there is no need for the CU to transmit a message to trigger the DU to perform the RIM-RS detection, that is, step 800 is not necessary to be performed.

When the DU of the victim base station detects the remote interference, is configured with the RIM-RS, and starts transmitting the RIM-RS at the air interface, the base station (Aggressor gNB) causing the remote interference may also receive the RIM-RS at the air interface through the atmospheric ducting phenomenon. When the DU of the aggressor base station detects the RIM-RS for the first time at the air interface, the DU reports to the CU the monitored RIM-RS information, and obtains the configured interference mitigation scheme and the allocated aggressor base station Set ID from the OAM, or the DU may configure the interference mitigation scheme by itself and utilize the pre-configured aggressor base station Set ID.

Step 806: The DU of the aggressor base station transmits a message to the CU, for reporting that the RIM-RS is detected.

When the DU of the aggressor base station detects the RIM-RS for the first time at the air interface, if the RIM-RS measurement result of the DU exceeds a reporting threshold (this threshold may be an absolute value of the RIM-RS power such as in unit of dBm), the DU needs to report to the CU. The message 806 includes one or more of the following information:
- a victim base station Set ID (acquired by demodulation of the RIM-RS) (when only the victim base station Set ID is present, it also implicitly indicates that the RIM-RS is detected);
- an indication of reception of RIM-RS (optional information, because when only the victim base station Set ID is present, it also implicitly indicates that the RIM-RS is detected);
- information of cell on which a RIM-RS is detected, such as cell identification information (an NR CGI, or a PCI, or an index) (optional information, the CU stores the information of cell on which the RIM-RS is detected) (or information of frequency on which the RIM-RS is detected);
- measurement result of each cell on which a RIM-RS is detected (such as a RIM-RS power value, time delay, and the like);
- information on interference mitigation scheme configured by DU, such as one or more interference mitigation schemes below (it does not exclude the interference mitigation scheme newly incorporated into the specification as the research progresses deeper) (the configuration of the interference mitigation scheme may be configured by the OAM to the CU, or may be configured by the DU itself):
    - time-domain solutions: such as muting downlink symbols that cause interference
    - frequency-domain solutions: such as changing transmission band BWP
    - power-domain solutions: such as reducing transmission power of downlink symbols that cause interference
    - spatial-domain solutions: such as changing the beam parameter, down-tilt
- an aggressor base station Set ID (it may be configured by the OAM to the DU, or the DU may be pre-configured with the Set ID).

Step 807: The CU of the aggressor base station transmits a message to the DU, for indicating to the DU to start to perform an interference mitigation scheme.

The CU of the aggressor base station transmits a message to the DU of the base station, for indicating that the DU starts performing an interference mitigation scheme. This message includes one or more of the following:
- indication information on performing interference mitigation scheme;
- information of cell on which interference mitigation scheme is performed, such as cell identification information (a NR CGI, or a PCI, or an index) (optional information, if the CU has already known the information of cell on which the RIM-RS is received at step 806, it may directly indicate the information of the cell on which the interference mitigation scheme is performed).

After receiving the message 807, the DU of the aggressor base station starts performing the interference mitigation scheme on the cell indicated by the CU. If the CU does not indicate the information of the cell on which the interference mitigation scheme is performed by the DU, the DU may perform the interference mitigation scheme on the cell on which the RIM-RS is detected or on the cell on which the RIM-RS is not detected.

Step 808: The DU of the aggressor base station transmits a message to the CU, for informing the CU of the information on the interference mitigation scheme that the DU has started performing.

When the DU detects the RIM-RS, if the DU may start performing the interference mitigation scheme by itself, it is not necessary to request the CU again, or the DU reports the monitored RIM-RS information to the OAM, obtains the configured interference mitigation scheme and the allocated aggressor base station Set ID from the OAM. And the measurement result of the RIM-RS detected by the DU satisfies the threshold for performing the interference mitigation scheme (if there is a threshold, it needs to be met, but it may be unnecessary to set the threshold), then the DU immediately starts performing the interference mitigation scheme, steps 806 and 807 may not be performed, and it directly proceeds from step 805 to step 808 to be performed. The DU may use the message at step 808 to inform the CU of the configuration information of the interference mitigation scheme decided by the DU (or configured by the OAM to the DU). The message at step 808 includes one or more of the following information:

information of cell on which a RIM-RS is detected, such as cell identification information (an NR CGI, or a PCI, or an index) (optional information, the CU stores the information of cell on which the RIM-RS is detected) (or information of frequency on which the RIM-RS is detected); and measurement result of each cell on which RIM-RS is detected (optional information, such as a RIM-RS power value, time delay, and the like);

a victim base station Set ID (acquired by demodulation of the RIM-RS) (when only Victim base station Set ID is present, it also implicitly indicates that the RIM-RS is detected);

an indication of reception of RIM-RS;

notification information on DU performing interference mitigation scheme;

information on interference mitigation scheme configured by a DU, such as one or more interference mitigation schemes below (it does not exclude the interference mitigation scheme newly incorporated into the specification as the research progresses deeper) (the configuration of interference mitigation scheme may be configured by the OAM to the DU, or may be configured by the DU itself):

time-domain solutions: such as muting downlink symbols that cause interference frequency-domain solutions: such as changing transmission band BWP power-domain solutions: such as reducing transmission power of downlink symbols that cause interference spatial-domain solutions: such as changing the beam parameter, down-tilt information of cell on which interference mitigation scheme is performed, such as cell identification information (a NR CGI, or a PCI, or an index) (optional information, the CU stores the information of the cell on which the interference mitigation scheme is performed);

an aggressor base station Set ID (it may be configured by the OAM to the DU, or the DU may be pre-configured with the Set ID).

When one DU detects the RIM-RS, in order to expand the scope of performing the interference mitigation scheme, it may be necessary for DUs near the DU to also perform the same interference mitigation scheme, so the DU informs the CU of the configuration information of the interference mitigation scheme decided by the DU (or configured by the OAM to the DU), and the CU needs to forward the configuration information of the interference mitigation scheme to other DUs. Alternatively, when one DU detects the RIM-RS, in order to expand the scope of performing the interference mitigation scheme, it may be necessary for DUs near the DU to also perform the same interference mitigation scheme, thus the DU informs the CU that the DU discovers the RIM-RS, the CU decides the configuration information of the interference mitigation scheme and transmits the configuration information of the interference mitigation scheme to all corresponding DUs.

If the DU initiates performing the interference mitigation scheme based on the message at step 807, this message may be a response message to step 807. In this case, the message at step 807 includes the following information:

response information on performing interference mitigation scheme.

Since there are multiple DUs in the same area that detect the RIM-RS and some of the DUs may be deployed under CUs of different base stations, the DUs that detect the RIM-RS, together with the CUs to which the DUs are connected, perform the above steps, and then the DUs get the same aggressor base station Set ID and the corresponding configuration information of the interference mitigation scheme, and initiate performing the interference mitigation scheme.

Step 809: The CU of the aggressor base station transmits a message to the AMF.

When the CU knows from the DU that the DU detects the RIM-RS, which shows that the atmospheric ducting phenomenon exists between the aggressor base station and the victim base station, the aggressor base station needs to inform the victim base station that the aggressor base station has already received the RIM-RS through backhaul signaling, the atmospheric ducting phenomenon still exists, and the victim base station needs to continue transmitting the RIM-RS, so that the aggressor base station continues monitoring when the atmospheric ducting phenomenon disappears. If the aggressor base station does not receive the RIM-RS, it proves that the atmospheric ducting phenomenon has disappeared. The message at step 809 includes one or more of the following information an aggressor base station Set ID;

a victim base station Set ID; and an indication of reception of RIM-RS.

Since there are multiple aggressor base stations in each aggressor base station Set ID, there are multiple DUs under each aggressor base station, and each DU transmits a message to the CU upon detecting the RIM-RS, if the step 809 is initiates to transmit the message to the AMF whenever the CU receives the report that the DU detects the RIM-RS, the signaling load at the Ng interface will be increased. Therefore, the CU of the aggressor base station only transmits one message to the AMF to report that the base station has detected the RIM-RS.

Step 810: The AMF forwards the message to the CU of the victim base station.

When the AMF receives a request from the aggressor base station, for forwarding the status information on reception of the RIM-RS to the base stations included in the destination victim base station Set ID, the AMF has already known the base station information included in the victim base station Set ID previously through step 804, so it forwards the message to the CU of the victim base station. Message 810 includes one or more of the following information:

- an aggressor base station Set ID;
- a victim base station Set ID; and
- an indication of reception of RIM-RS.

Step 811: The CU of the victim base station transmits a message to the DU, for indicating that the RIM-RS continues being transmitted.

When the CU of the victim base station receives status information indicating reception of RIM-RS forwarded from the AMF, the CU may transmit the message to the DU to indicate the status of reception of RIM-RS to the DU, and then the DU decides to continue transmitting the RIM-RS, or the CU directly indicates continuing transmission of the RIM-RS to the DU, so as to monitor when the atmospheric ducting phenomenon disappears. If a mechanism at the DU side is that the RIM-RS continues being transmitted until an indication of disappearance of RIM-RS or indication information on stopping transmission of RIM-RS is received, this indication message is not mandatory, because the DU has already been in the status of transmitting the RIM-RS. If there is a corresponding timer mechanism at the DU side, in which if an indication of reception of the RIM-RS or indication information on continuing transmission of the RIM-RS has not been received when the timer expires, the DU will stop transmitting the RIM-RS, then the indication message is mandatory. The message includes the first message or the second and third messages as follows:

- an indication of reception of RIM-RS;
- indication information on continuing transmission of RIM-RS; and
- information of cell on which the RIM-RS continues being transmitted, such as cell identification information (a NR CGI, or a PCI, or an index) (optional information, if the CU has already known the information of the cell on which transmission of the RIM-RS is initiated, the CU may directly indicate the information of the cell on which the RIM-RS continues being transmitted).

After the DU obtains the status information on reception of the RIM-RS from the CU, the DU knows on which cells the RIM-RS is being transmitting, and the DU may decide that the RIM-RS continues being transmitted on these cells.

Step 812: The DU of the aggressor base station transmits a message to the CU, for reporting reception of the RIM-RS.

The DU at the victim base station side continues to transmit the RIM-RS. If the atmospheric ducting phenomenon still exists, the DU of the aggressor base station may still detect the RIM-RS, and then report to the CU, steps 809 and 810 continue to be performed to indicate to the CU of the victim base station the status information on reception of the RIM-RS through the backhaul signaling, and then through optional step 811, the DU of the victim base station is indicated to continue transmitting the RIM-RS. The message 812 includes one or more of the following information:

- a victim base station Set ID (acquired by demodulation of the RIM-RS) (when only the victim base station Set ID is present, it also implicitly indicates that the RIM-RS is detected); and
- an indication of reception of RIM-RS (optional information, because when only the victim base station Set ID is present, it also implicitly indicates that the RIM-RS is detected).

Step 813: The DU of the aggressor base station transmits a message to the CU, for reporting disappearance of RIM-RS.

The DU at the victim base station side continues transmitting the RIM-RS. If the atmospheric ducting phenomenon disappears and in all the cells under the DU of the aggressor base station the status of RIM-RS is not detected, the DU reports the status information on disappearance of the RIM-RS to the CU. The message 813 includes one or more of the following information:

- a victim base station Set ID (optional information, if the method, in which of detection of the RIM-RS is implicitly indicated when only the victim base station Set ID is present, is used, when there is no victim base station Set ID, the disappearance of RIM-RS is implicitly indicated); and
- an indication of disappearance of RIM-RS (optional information, if the method, in which detection of the RIM-RS is implicitly indicated when only the victim base station Set ID is present, is used, it also can be used that when there is no victim base station Set ID, disappearance of the RIM-RS is implicitly indicated).

Since there are multiple aggressor base stations in each aggressor base station Set ID, there are multiple DUs under each aggressor base station, and there are multiple cells under each DU, when in all the cells under the DU the status of the RIM-RS is not detected, the DU reports the status information on disappearance of the RIM-RS to the CU. Similarly, when all the DUs under the CU do not detect the status of the RIM-RS, the CU triggers step 816 to report the status information on disappearance of the RIM-RS to the AMF.

Step 814: The CU of the aggressor base station transmits a message to the DU, for indicating termination of the interference mitigation scheme.

When in all the cells under the DU of the aggressor base station the status of the RIM-RS is not detected, the DU reports the status information on disappearance of the RIM-RS to the CU, and then the CU indicates terminating the interference mitigation scheme to the DU. The message 814 includes one or more of the following information:

- indication information on terminating interference mitigation scheme; and
- information of cell on which interference mitigation scheme is terminated such as cell identification information (a NR CGI, or a PCI, or an index) (optional information, if the CU has already known the cell information on start of performance of interference mitigation scheme, it may directly indicate the information of cell on which interference mitigation scheme is terminated).

Another way to be taken is that the DU knows cells on which the interference mitigation scheme is being performed, when in all the cells the RIM-RS is not received, which shows that the atmospheric ducting phenomenon does not exist for the area covered by all the cells under the DU, so the DU may decide to terminate the interference mitigation scheme and stop monitoring the RIM-RS, and then transmit an indication message of terminating an interference mitigation scheme to inform the CU.

Step 815: The DU of the aggressor base station transmits a response message to the CU, for indicating that the DU has terminated the interference mitigation scheme.

The DU obtains the indication from the CU through the message at step 814, and terminates the interference mitigation scheme. The DU may then transmit a response message to the CU to indicate a friendly process of terminating the interference mitigation scheme. The message at step 815 includes the following information:

response information on terminating interference mitigation scheme.

When in all the cells under the DU of the aggressor base station the status of the RIM-RS is not detected, the DU reports the status information on disappearance of the RIM-RS to the CU. Then the DU may decide to terminate performance of the interference mitigation scheme by itself, without need for the CU to perform step 814 to indicate termination of the interference mitigation scheme to the DU, and then the DU transmit a message to the CU. In this case, the message at step 815 includes the following information:

notification information on DU terminating interference mitigation scheme.

If, after getting the report of the DU detecting the RIM-RS, the CU indicates application of the interference mitigation scheme on the nearby DUs in which the RIM-RS is not detected, for stopping interference mitigation scheme for these DUs, step 814 and step 815 is performed so that stopping the mitigation scheme is triggered by the CU. Because these DUs do not detect the RIM-RS, and are not able to detect when the RIM-RS disappears, so the CU is required to control performing and stopping the interference mitigation scheme.

When the DU terminates performing the interference mitigation scheme and restores the original configuration, it stops monitoring the RIM-RS.

Step 816: The CU of the aggressor base station transmits a message to the AMF.

When the CU of the aggressor base station knows that all the DUs do not detect the status of the RIM-RS, it needs to inform the victim base station by using the backhaul signaling. The victim base station is used to judge whether the transmitted RIM-RS is received at the aggressor base station side. If it is not received, it indicates that the atmospheric ducting phenomenon disappears, and transmission of the RIM-RS needs to be stopped. Message 816 includes one or more of the following:

an aggressor base station Set ID;
 a victim base station Set ID; and
 an indication of disappearance of RIM-RS.

Since there are multiple aggressor base stations under each AMF, there are multiple DUs under each aggressor base station. When all the DUs under one CU do not detect the RIM-RS, the CU reports the indication of disappearance of the RIM-RS to the AMF. Similarity, when all the aggressor base stations under the AMF do not detect the RIM-RS, step 817 is triggered, at which the AMF forwards the indication of disappearance of the RIM-RS to the victim base station.

Step 817: The AMF forwards a message to the CU of the victim base station.

When all the aggressor base stations under the AMF do not detect the RIM-RS, the AMF forwards the indication of disappearance of the RIM-RS to the victim base station. The AMF has already known the base station information included in the victim base station Set ID previously at step 804, so it forwards the message to the CU of the victim base station. The message 817 includes one or more of the following information an aggressor base station Set ID;
 a victim base station Set ID; and
 an indication of disappearance of RIM-RS.

Step 818: The CU of the victim base station transmits a message to the DU, for indicating stopping transmission of the RIM-RS.

When the CU of the victim base station receives status information indicating disappearance of the RIM-RS forwarded from the AMF, which shows that the atmospheric ducting phenomenon disappears, the CU needs to transmit the message of disappearance of the RIM-RS to the DU, or directly indicates stopping transmission of the RIM-RS to the DU. The message includes the first message or the second and third messages as follows:

an indication of disappearance of RIM-RS;
 indication information on stopping transmission of RIM-RS; and
 information of cell on which transmission of the RIM-RS is stopped, such as cell identification information (a NR CGI, or a PCI, or an index) (optional information, if the CU has already known the information of the cell on which transmission of the RIM-RS is initiated, the CU may directly indicate the information of the cell on which transmission of the RIM-RS is stopped).

After the DU obtains status information on disappearance of the RIM-RS from the CU, the DU knows cells on which the RIM-RS is being transmitted, and the DU may decide to stop transmitting the RIM-RS, and then may transmit a response message to inform the CU.

Step 819: The DU of the victim base station transmits a response message to the CU, for indicating that the DU has stopped transmitting the RIM-RS.

If the message at step 818 carries the indication information on disappearance of the RIM-RS to the DU, after the DU stops transmitting the RIM-RS, it may transmit notification information on stopping transmission of the RIM-RS to the CU. The message at step 819 includes one or more of the following information:

notification information on DU stopping transmission of RIM-RS.

If the message at step 818 carries the indication information on stopping transmission of RIM-RS to the DU, after stopping transmitting the RIM-RS, the DU may transmit a response message to the CU to indicate a friendly process of termination of stopping transmission of the RIM-RS. The message at step 819 includes the following information:

response information on stopping transmission of RIM-RS.

Figure 9:
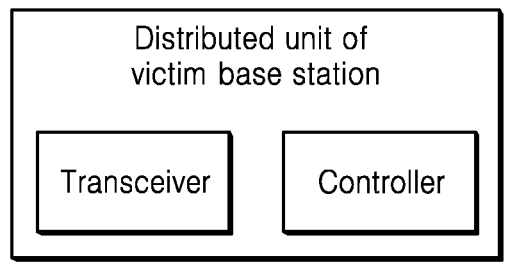
FIG. 9 illustrates a block diagram of a distributed unit of an victim base station according to an embodiment of the present disclosure.

FIG. 9 illustrates a block diagram of a distributed unit of a victim base station according to an embodiment of the present disclosure. Referring to FIG. 9, the distributed unit of the victim base station proposed by the present disclosure includes: a transceiver configured to receive and transmit information; and a controller configured to control the device to implement the method proposed in the present disclosure, for example, to control the device to receive information related to a reception status of a reference signal transmitted by a central unit device of the base station, and to perform or stop transmission of the reference signal based on the information related to the reception status of the reference signal.

Figure 10:
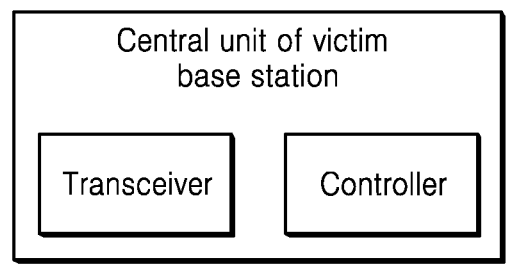
FIG. 10 illustrates a block diagram of a central unit of a victim base station according to an embodiment of the present disclosure.

FIG. 10 illustrates a block diagram of a central unit of a victim base station according to an embodiment of the present disclosure. Referring to FIG. 10, the central unit of the victim base station proposed by the present disclosure includes: a transceiver configured to receive and transmit information; and a controller configured to control the device to implement the method proposed in the present disclosure, for example, to receive, from a central unit device of an aggressor base station, information related to a reception status of a reference signal through a backhaul network, and to perform transmission of information related to a reception status of a reference signal received by a distributed unit device of the base station, such that the distributed unit device of the base station performs or stops transmission of the reference signal based on the information related to the reception status of the reference signal.

Figure 11:
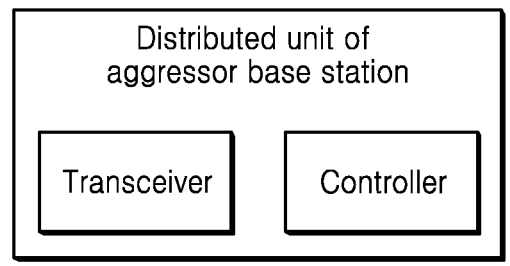
FIG. 11 illustrates a block diagram of a distributed unit of an aggressor base station according to an embodiment of the present disclosure.

FIG. 11 illustrates a block diagram of a distributed unit of an aggressor base station according to an embodiment of the present disclosure. Referring to FIG. 11, the distributed unit of the aggressor base station proposed by the present disclosure includes: a transceiver configured to receive and transmit information; and a controller configured to control the device to implement the method proposed in the present disclosure, for example, to control the device to transmit information related to a reception status of a reference signal received by a central unit device of the base station, and to perform or stop performing an interference mitigation scheme based on the information related to the reception status of the reference signal.

Figure 12:
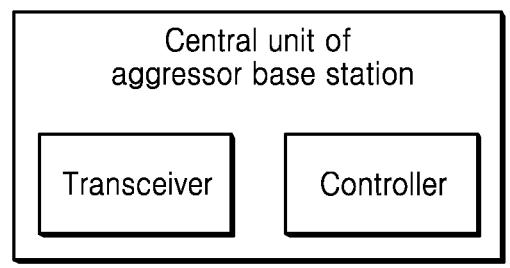
FIG. 12 illustrates a block diagram of a central unit of an aggressor base station according to an embodiment of the present disclosure.

FIG. 12 illustrates a block diagram of a central unit of an aggressor base station according to an embodiment of the present disclosure. Referring to FIG. 12, the central unit of the aggressor base station proposed by the present disclosure includes: a transceiver configured to receive and transmit information; and a controller configured to control the device to implement the method proposed in the present disclosure, for example, to control the device to receive information related to a reception status of a reference signal transmitted by a distributed unit device of the base station such that the distributed unit device of the base station performs or stops performing an interference mitigation scheme based on the information related to the reception status of the reference signal, and to transmit the information related to the reception status of the reference signal to a central unit device of a victim base station through a backhaul network.

In the above embodiments, all operations and messages may be selectively performed or omitted. In addition, the steps in each embodiment are not necessarily performed sequentially, and the order may be changed. It is also possible to perform information transfer out of order, and the sequence of information transfer may be changed.

Meanwhile, the exemplary embodiments of the present disclosure shown and described in the specification and the drawings correspond to specific examples presented in order to explain easily the technical content of the present disclosure and to aid in understanding of the present disclosure, but are not intended to limit the scope of the present disclosure. That is, it is apparent for those skilled in the art to which the present disclosure pertains that various modifications can be realized based on the technical spirit of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an aggressor gNB in a wireless communication system, the method comprising:
   transmitting, from a distributed unit (DU) of the aggressor gNB to a central unit (CU) of the aggressor gNB, a message associated with a gNB-DU configuration update procedure comprising an aggressor gNB set identification (ID) information element (IE); and
   transmitting, from the DU of the aggressor gNB to the CU of the aggressor gNB, a message comprising remote interference management (RIM) information, wherein the RIM information comprises status information on at least one RIM-reference signal (RS) indicating RIM-RS disappearance or RIM-RS detected,
   wherein the CU of the aggressor gNB hosts radio resource control (RRC) and packet data convergence protocol (PDCP) network protocol layers of the aggressor gNB,
   wherein the DU of the aggressor gNB hosts radio link control (RLC), medium access control (MAC), and physical (PHY) network protocol layers of the aggressor gNB, and
   wherein an F1 interface is an interface between the DU of the aggressor gNB and the CU of the aggressor gNB.

2. The method of claim 1, further comprising:
   receiving, from a victim gNB, the at least one RIM-RS; and
   transmitting, to the victim gNB, the status information on the at least one RIM-RS.

3. The method of claim 1, wherein the RIM information further comprises a victim gNB set ID, and the victim gNB set ID is used to identify a group of gNBs that transmit a same RIM-RS.

4. The method of claim 1, wherein the RIM information further comprises information on an aggressor cell, and the information on the aggressor cell is related to at least one cell global identifier (CGI).

5. The method of claim 2, wherein the victim gNB stops transmitting the at least one RIM-RS based on the status information on the at least one RIM-RS.

6. A method performed by a victim gNB in a wireless communication system, the method comprising:
   transmitting, from a distributed unit (DU) of the victim gNB to a central unit (CU) of the victim gNB, a message associated with a gNB-DU configuration update procedure comprising a victim gNB set identification (ID) information element (IE); and
   transmitting, from the CU of the victim gNB to the DU of the victim gNB, a message comprising remote interference management (RIM) information, wherein the RIM information comprises status information on at least one RIM-reference signal (RS) indicating RIM-RS disappearance or RIM-RS detected,
   wherein the CU of the victim gNB hosts radio resource control (RRC) and packet data convergence protocol (PDCP) network protocol layers of the victim gNB,
   wherein the DU of the victim gNB hosts radio link control (RLC), medium access control (MAC), and physical (PHY) network protocol layers of the victim gNB, and
   wherein an F1 interface is an interface between the DU of the victim gNB and the CU of the victim gNB.

7. The method of claim 6, further comprising:
   transmitting, to an aggressor gNB, the at least one RIM-RS; and
   receiving, from the aggressor gNB, the status information on the at least one RIM-RS.

8. The method of claim 6, wherein the RIM information further comprises a victim gNB set ID, and the victim gNB set ID is used to identify a group of gNBs that transmit a same RIM-RS.

9. The method of claim 7, further comprising:
   stopping transmitting the at least one RIM-RS based on the status information on the at least one RIM-RS.

10. An aggressor gNB in a wireless communication system, the aggressor gNB comprising:
    a transceiver; and
    at least one processor connected with the transceiver and configured to:
    transmit, from a distributed unit (DU) of the aggressor gNB to a central unit (CU) of the aggressor gNB, a message associated with a gNB-DU configuration update procedure comprising an aggressor gNB set identification (ID) information element (IE); and transmitting, from the DU of the aggressor gNB to the CU of the aggressor gNB, a message comprising remote interference management (RIM) information, wherein the RIM information comprises status information on at least one RIM-reference signal (RS) indicating RIM-RS disappearance or RIM-RS detected, wherein the CU of the aggressor gNB hosts radio resource control (RRC) and packet data convergence protocol (PDCP) network protocol layers of the aggressor gNB, wherein the DU of the aggressor gNB hosts radio link control (RLC), medium access control (MAC), and physical (PHY) network protocol layers of the aggressor gNB, and wherein an F1 interface is an interface between the DU of the aggressor gNB and the CU of the aggressor gNB.

11. The aggressor gNB of claim 10, wherein the at least one processor is further configured to:

receive, from a victim gNB, the at least one RIM-RS; and transmit, to the victim gNB, the status information on the at least one RIM-RS.

12. The aggressor gNB of claim 10, wherein the RIM information further comprises a victim gNB set ID, and the victim gNB set ID is used to identify a group of gNBs that transmit a same RIM-RS.

13. The aggressor gNB of claim 10, wherein the RIM information further comprises information on an aggressor cell, and the information on the aggressor cell is related to at least one cell global identifier (CGI).

14. The aggressor gNB of claim 11, wherein the victim gNB stops transmitting the at least one RIM-RS based on the status information on the at least one RIM-RS.

15. A victim gNB in a wireless communication system, the victim gNB comprising:

a transceiver; and at least one processor connected with the transceiver and configured to:

transmit, from a distributed unit (DU) of the victim gNB to a central unit (CU) of the victim gNB, a message associated with a gNB-DU configuration update procedure comprising a victim gNB set identification (ID) information element (IE); and transmitting, from the CU of the victim gNB to the DU of the victim gNB, a message comprising remote interference management (RIM) information, wherein the RIM information comprises status information on at least one RIM-reference signal (RS) indicating RIM-RS disappearance or RIM-RS detected, wherein the CU of the victim gNB hosts radio resource control (RRC) and packet data convergence protocol (PDCP) network protocol layers of the victim gNB, wherein the DU of the victim gNB hosts radio link control (RLC), medium access control (MAC), and physical (PHY) network protocol layers of the victim gNB, and wherein an F1 interface is an interface between the DU of the victim gNB and the CU of the victim gNB.

16. The victim gNB of claim 15, wherein the at least one processor is further configured to:

transmit, to an aggressor gNB, the at least one RIM-RS; and receive, from the aggressor gNB, the status information on the at least one RIM-RS.

17. The victim gNB of claim 15, wherein the RIM information further comprises a victim gNB set ID, and the victim gNB set ID is used to identify a group of gNBs that transmit a same RIM-RS.

18. The victim gNB of claim 16, wherein the at least one processor is further configured to stop transmitting the at least one RIM-RS based on the status information on the at least one RIM-RS.

* * * * *